US009616362B2

(12) United States Patent
Johnson et al.

(10) Patent No.: US 9,616,362 B2
(45) Date of Patent: Apr. 11, 2017

(54) BAGGED FILTER CARTRIDGE, SYSTEM AND METHOD

(75) Inventors: Richard Johnson, Charlotte, NC (US); Benjamin Harrison, Sacramento, CA (US)

(73) Assignee: BHA Altair, LLC, Franklin, TN (US)

( * ) Notice: Subject to any disclaimer, the term of this patent is extended or adjusted under 35 U.S.C. 154(b) by 949 days.

(21) Appl. No.: 13/353,966

(22) Filed: Jan. 19, 2012

(65) Prior Publication Data

US 2013/0186841 A1 Jul. 25, 2013

(51) Int. Cl.
*B01D 37/00* (2006.01)
*B01D 29/00* (2006.01)
*B01D 35/30* (2006.01)
*B01D 29/39* (2006.01)
*B01D 29/41* (2006.01)

(52) U.S. Cl.
CPC ............. *B01D 29/41* (2013.01); *B01D 35/30* (2013.01); *B01D 2201/302* (2013.01); *B01D 2201/307* (2013.01)

(58) Field of Classification Search
None
See application file for complete search history.

(56) References Cited

U.S. PATENT DOCUMENTS

| | | | |
|---|---|---|---|
| 2,341,114 A | 2/1944 | Novak | |
| 2,978,108 A | 4/1961 | Strassheim | |
| 3,701,433 A | 10/1972 | Krakauer et al. | |
| 3,765,536 A | 10/1973 | Rosenberg | |
| 4,929,352 A | 5/1990 | Wolf | |
| 6,540,913 B1 | 4/2003 | Guichaoua et al. | |
| 2002/0162308 A1 | 11/2002 | Mullins et al. | |
| 2004/0094467 A1 | 5/2004 | Diemer et al. | |
| 2006/0021925 A1 | 2/2006 | Stifelman | |
| 2008/0308485 A1 | 12/2008 | Bagci et al. | |
| 2010/0264100 A1* | 10/2010 | Rivera ................... | B01D 29/41 210/808 |
| 2013/0186841 A1* | 7/2013 | Johnson ................ | B01D 29/41 210/767 |
| 2015/0129510 A1* | 5/2015 | Johnson ................ | B01D 29/41 210/767 |

FOREIGN PATENT DOCUMENTS

| | | |
|---|---|---|
| DE | 10 2007 004 114 B3 | 2/2008 |
| EP | 0 516 846 A1 | 12/1992 |
| EP | 0 537 521 A1 | 4/1993 |
| JP | 2004033974 A | 2/2004 |
| WO | WO 98/23356 A2 | 6/1998 |
| WO | WO 2005/061074 A1 | 7/2005 |
| WO | WO 2008/111825 A1 | 9/2008 |

(Continued)

OTHER PUBLICATIONS

Purolator Depth-Clear(TM) D Series Brochure, two pages, published Mar. 2009.*

(Continued)

*Primary Examiner* — Robert Popovics
(74) *Attorney, Agent, or Firm* — Reinhart Boerner Van Deuren P.C.

(57) ABSTRACT

A filter assembly is provided. The filter assembly includes a filter cartridge with a containment bag including a vent port and a support housing, including a split lid.

24 Claims, 17 Drawing Sheets

(56) References Cited

FOREIGN PATENT DOCUMENTS

| WO | WO 2009/132864 A1 | 11/2009 |
| WO | WO 2012/007222 A1 | 1/2012 |

OTHER PUBLICATIONS

Purolator Advanced Filtration; Depth-Clear™ Series; Precision Depth Filter Sheets for Critical Process Fluids; Product Brochure; dated Jan. 2004; 2 pages.
Purolator Advanced Filtration; Depth-Clear™ C Series; High Capacity Activated Carbon Filter Modules; Product Brochure; dated Jan. 2004; 2 pages.
Purolator Advanced Filtration; Dyna-Clear™ F; High Capacity Felt Liquid Filter Bags; Product Brochure; dated Nov. 2003; 2 pages.
Purolator Advanced Filtration; Dyna-Clear™ M; High Performance Mesh Filter Bags; Product Brochure; dated Nov. 2003; 2 pages.
Purolator Advanced Filtration; Depth-Clear™ P & LE Series; Depth Filter Modules for Biopharmaceutical Applications; Product Brochure; dated Jan. 2004; 2 pages.
Purolator Advanced Filtration; Depth-Clear™ S Series; Depth Filter Modules for Critical Process Fluids; Product Brochure; dated Jan. 2004; 2 pages.
Purolator Advanced Filtration; Depth-Clear™ SA & U Series; Depth Filter Modules for Critical Hydraulic Fluids; Product Brochure; dated Jan. 2004; 2 pages.

\* cited by examiner

BAGGED FILTER CARTRIDGE, SYSTEM AND METHOD

FIELD OF THE INVENTION

This invention generally relates to filters and more particularly relates to filter cartridges, housings, and the enclosures and related connections for filter elements such as may be employed in industrial process filtration.

BACKGROUND OF THE INVENTION

There are numerous applications for industrial process filtration such as in the biotech, pharmaceutical, food and beverage industries, to name a few. In these industries, it is relatively common to employ combination adsorption and depth filter media such as the DEPTH-CLEAR series media provided by the present assignee, also referred to as Purolator Liquid Process one of the CLARCOR companies. In this type of media, particles are captured through a combination of mechanical capture due to pore size and as well as electro-kinetic adsorption. For example, cellulous media and/or synthetic materials and/or combinations thereof may be used to provide a substrate. Additionally, such material as activated carbon, clays and other materials may be supported or otherwise integrated into the disc to provide for electro-kinetic absorption.

For example, Purolator Liquid Process has a number of depth filter modules comprising stacked discs of depth filter sheets that provide for filter media elements including different series for different filtration applications (e.g. P, LE, C, SA, U, and S series). Each different series may be used for a different application. For example, the SA and U series may be used for removal of carbon particles and low levels of moisture that may result from the breakdown of dielectric oil; and therefore, can be used for filtration of a number of oils. Different grades and particle removal efficiencies may be obtained in such grades. Also, for example, the DEPTH-CLEAR S series of Purolator Liquid Process may be used for such applications as beer, wine, juices and cider, chemicals, resins, inks, varnishes and the like to remove particles, micro-organisms, colloids, and pyrogen from critical process streams. The DEPTH-CLEAR C series is a high capacity activated carbon filter module built of formed discs that also may be used in a number of different applications. Also, the DEPTH-CLEAR P and LE series are used in biotech applications such as for antibiotics, blood products, intravenous solutions, cough syrups and the like. These types of filter media elements may be employed in embodiments of the present invention.

Typically, the DEPTH-CLEAR elements and other competitive elements are installed in reusable stainless steel housings which provide for washing and cleaning ability. In such existing applications, there is considerable downtime associated with filter change out when these filter elements become spent. Specifically, change out requires isolating the housing by shutting off appropriate valves and then cleaning the housing after the filter element is removed by washing out the unfiltered filtrate contained within the housing.

Also known in the filtration industry are porous filtration bags such as the DynaClear F and DynaClear M Series of Purolator Advanced Filtration which contain filter media of a certain porosity to allow for high fluid flow at low pressure drops while having a significant contaminant holding capacity through barrier and/or depth filtration. While filter bags work adequate in some applications, it is difficult to obtain a significant surface area with filter bags. Hence, more compact filter elements such as using stacked discs as in the DEPTH-CLEAR series depth filter sheets and filter elements described above is often provided to provide for a compact assembly that provides for a high filtration capacity with substantial surface area and flow capacity.

The present invention is directed toward improvements over the state of the art.

BRIEF SUMMARY OF THE INVENTION

In one aspect, an embodiment of a filter cartridge is provided. The filter cartridge includes a containment bag. The filter cartridge also includes an inlet port. The inlet port extends through the containment bag adapted to receive fluid into the bag. The filter cartridge also includes an outlet port. The outlet port extends through the containment bag adapted to outlet fluid from the filter cartridge. The filter cartridge also includes a vent port. The vent port extends through the containment bag. The filter cartridge also includes a filter media element. The filter media element is disposed in the containment bag and is connected to the outlet port.

In another aspect, an embodiment of a filter assembly is provided. The filter assembly includes a filter cartridge. The filter cartridge includes a containment bag. The filter cartridge also includes an inlet port. The inlet port extends through the containment bag adapted to receive fluid into the bag. The filter cartridge also includes an outlet port. The outlet port extends through the containment bag adapted to outlet fluid from the filter cartridge. The filter cartridge also includes a vent port. The vent port extends through the containment bag. The filter cartridge also includes a filter media element. The filter media element is disposed in the containment bag and is connected to the outlet port. The filter cartridge is supported inside of a housing. Each of the ports comprises a fitting including an inlet fitting, an outlet fitting, and a vent port fitting. The housing includes a bowl having an open end and split lid having at least two portions that are dividable and joinable. The split lid has an inlet aperture receiving the inlet fitting and a vent aperture receiving the vent fitting.

In another aspect, an embodiment of a method of filtering fluid is provided. The method includes inletting unfiltered fluid into a containment bag. The method also includes venting air from the containment bag. The method also includes containing a filter media pack in the containment bag. The filter media pack includes a hollow interior that has an opening at one end and is closed to fluid flow at a second end opposite the one end. The method also includes filtering the unfiltered fluid through a filter media pack contained in the containment bag to produce filtered fluid. The method also includes outletting filtered fluid from the filter element and through said opening and through the containment bag.

In another aspect, an embodiment of a filter assembly is provided. The filter assembly includes a containment bag. The filter assembly also includes an inlet port extending through the containment bag adapted to receive fluid into the bag. The filter assembly also includes an outlet port extending through the containment bag adapted to outlet fluid from the filter cartridge. The filter assembly also includes a filter media element disposed in the containment bag and connected to the outlet port. The filter assembly also includes a carrier bag adapted to hold and carry the containment bag, the carrier bag having an open top end, the containment bag received through an open top end and being removable through the open top end during use.

In yet another aspect, a method of filtering fluid is provided. The method includes providing a filter cartridge having an inlet port and an outlet port. The method also includes providing a carrier bag adapted to contain the cartridge. The carrier bag has an outlet. The method also includes placing the filter cartridge within the carrier bag. The outlet port is arranged to allow passage of filtered fluid to pass through the outlet port out of the carrier bag. The method also includes placing the carrier bag with the filter cartridge therein in a housing. The method also includes providing unfiltered fluid to the inlet port of the filter cartridge, filtering the fluid through the filter cartridge, and having the filtered fluid exit the carrier bag through the outlet. The method also includes utilizing the carrier bag to remove the filter cartridge from the housing.

In another aspect a housing for containing and supporting a filter cartridge including a filter element housed in a bag, an inlet fitting projecting from the bag for receiving inlet fluid to be filtered by the filter element, and a vent fitting projecting from the bag is provided. The housing includes a support housing portion. The support housing portion has an open end. The housing also includes a lid portion. The lid portion is configured to selectively close the open end of the support housing. The lid portion includes a split lid. The split lid includes at least two portions. The two portions are dividable and are configured to be placed in an assembled configuration. In the assembled configuration the two portions define an inlet aperture. The inlet aperture is configured to receive and maintain in position an inlet fitting of a filter cartridge.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
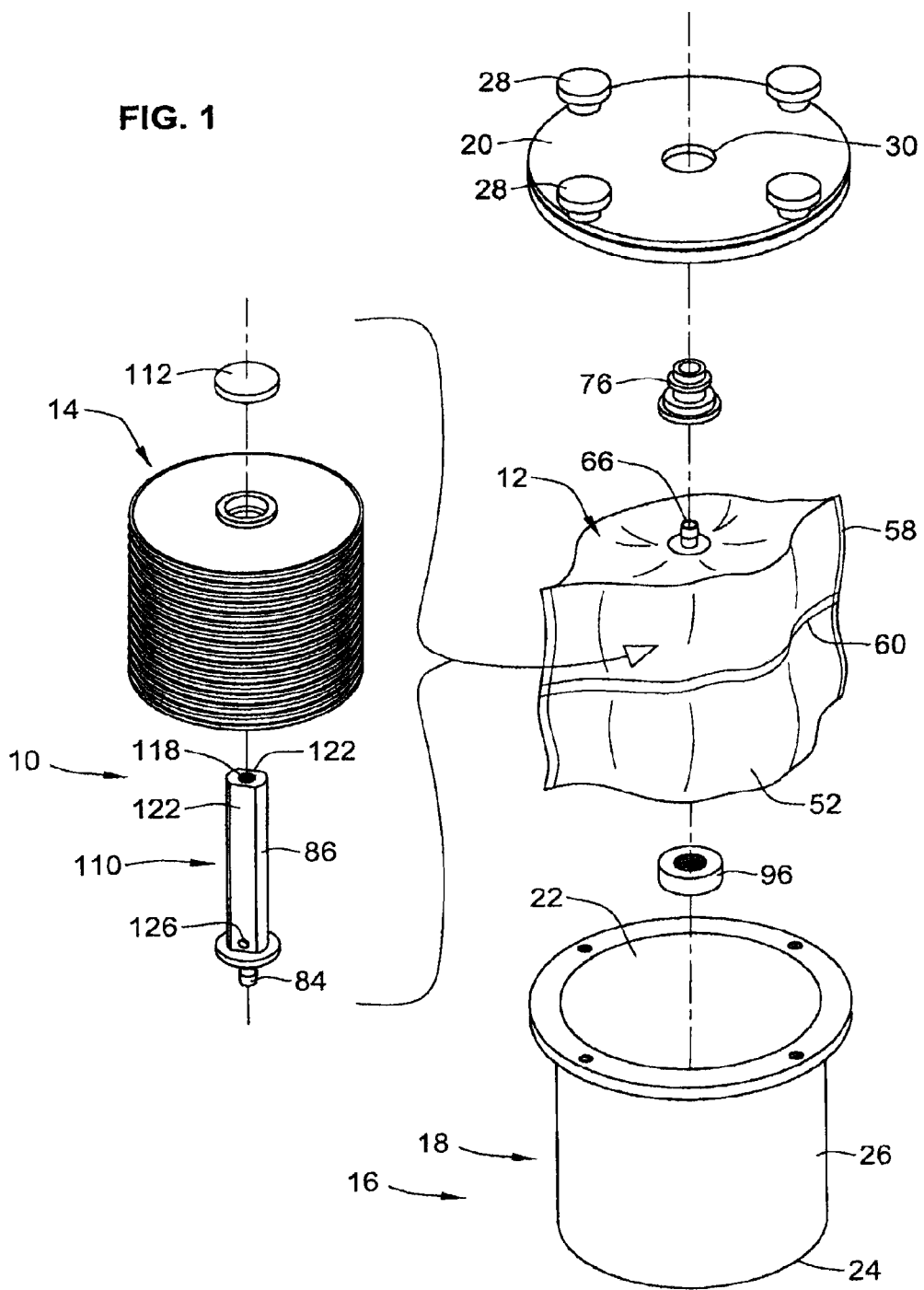
FIG. 1 is an exploded isometric view of the components of a filter assembly including a filter in combination with a filter support housing, in accordance with an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to the Figures, an embodiment of the present invention has been illustrated as a filter in the form of a filter cartridge 10, that includes an enclosure in the form of a bag 12 that encloses a filter element 14 (also referred to as filter media element). The filter element 14 includes suitable filter media 15 that provides barrier/surface loading filtration, depth filtration, adsorption filtration, and/or combinations thereof. The filter cartridge 10 can be installed in a support housing assembly 16, and thereby provides for a filter assembly (e.g. a combination of the filter and the support housing assembly).

Before turning to the details of filter cartridge 10, with reference to FIG. 1, details will be provided about the support housing assembly 16. The support housing assembly 16 may include a support housing 18 and a cover 20 that closes the open end 22 of the support housing 18. As illustrated, the support housing is generally a bowl-like member to include a disc-like base 24 and an annular and axially extending cylindrical side wall 26 extending vertically upward from the base 24 to define the open end 22. The open end 22 is sized large enough such that it is adapted to receive the filter cartridge 10 through the open end. Fastener knobs 28 may be provided to releaseably secure the cover 20 to the support housing 18. The fastener knobs can be manually screwed to manually secure or release the cover from the support housing.

As illustrated, the cover 20, and base 24 may include respective and diametrically opposed entrance and exit ports 30, 32 to accommodate fluid flow into and out of the filter cartridge 10. The support housing and cover may comprise stainless steel material or other rigid material such as rolled sheet metal or molded plastics that adequately provides support to the bag 12 of the filter cartridge 10 when it is filled with fluid, such as liquid. Thus, the support housing 18 generally carries the weight of the filter cartridge including the liquid contained therein and also supports the bag 12 against fluid pressure that is exerted in the filter cartridge 10; and in part, due to the resistance provided by the filter element 14. To accommodate the filter cartridge 10 and to allow for expansion 12 of the bag, vent openings may optionally be provided that are adapted to vent air from inside the housing when the bag receives unfiltered fluid that causes the bag to expand and thereby conform substantially to an interior of the housing. This reduces air pockets and/or the size of such air pockets when the filter cartridge 10 is employed in use within the support housing assembly 16.

Figure 3:
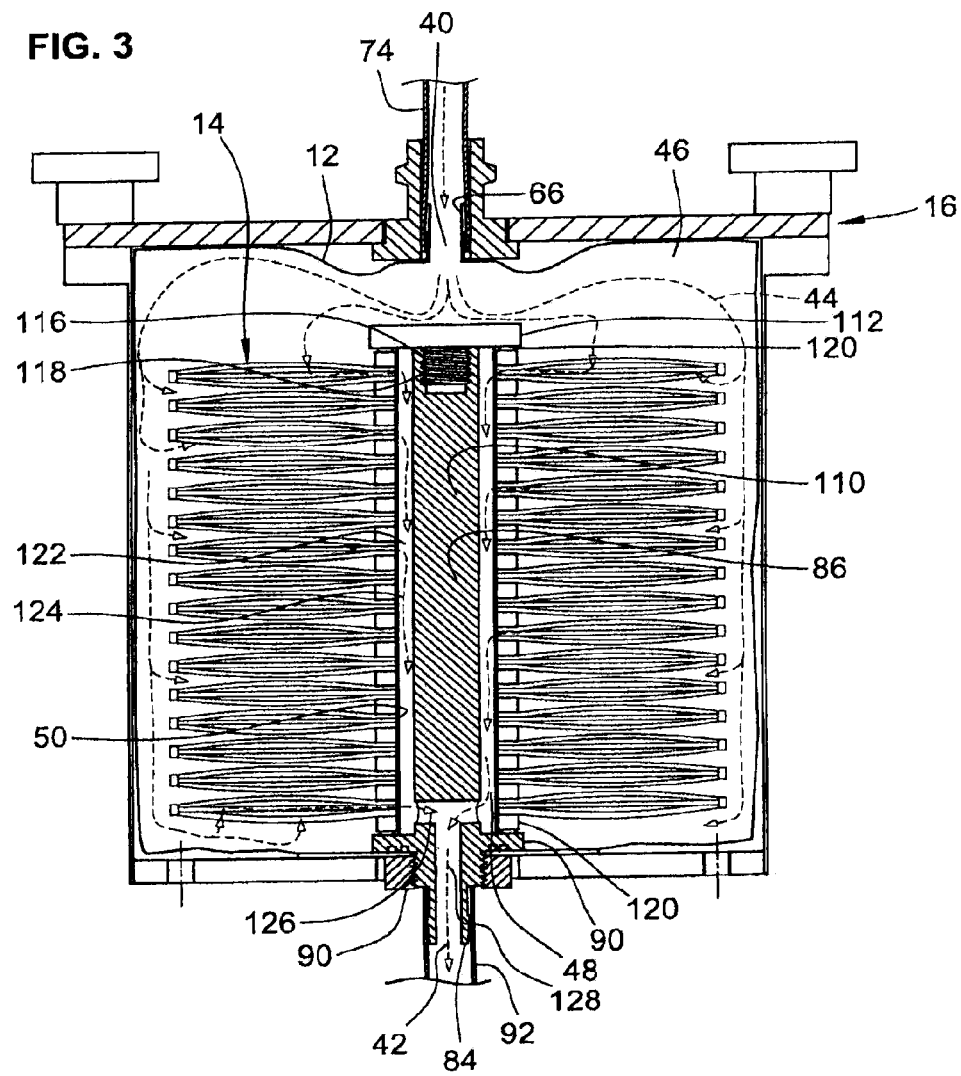
FIG. 3 is a cross section of the filter assembly shown in previous figures in an assembled state with fluid flow paths indicated.
Figure 4:
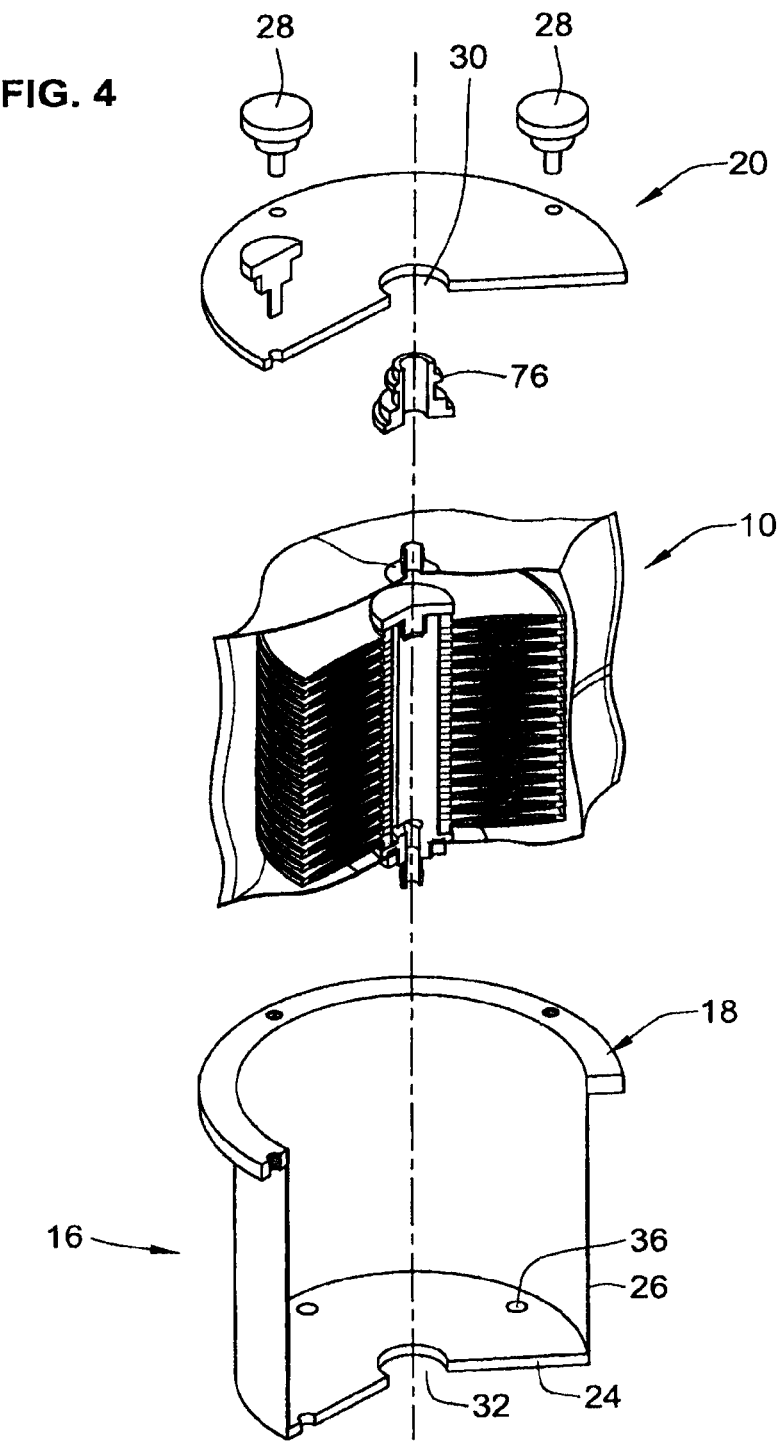
FIG. 4 is a partial cutaway cross-sectional isometric view of the assembled filter to illustrate how it is installed within a support housing in which the support housing is shown in exploded view.
Figure 5:
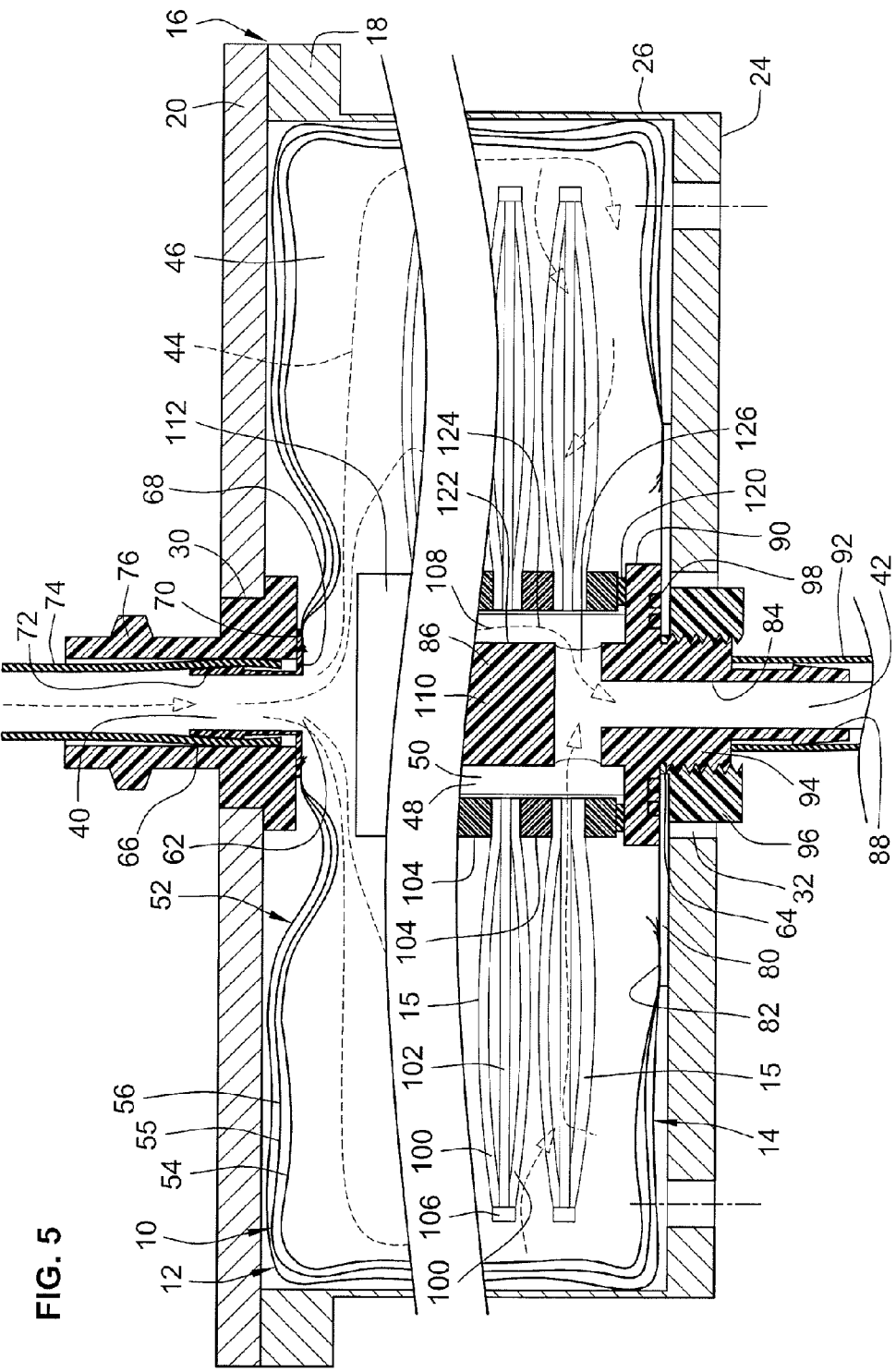
FIG. 5 is a enlarged view of the opposed ends of the filter assembly shown in FIG. 3 to better illustrate how the inlet fittings are attached to the bag and show that the bag may contain multiple layers as illustrated.

Turning in greater detail to the filter cartridge as illustrated in FIGS. 3 and 5, it is seen that the bag 12 acts as an enclosure to fully enclose the filter element 14. The bag 12 is adapted to receive fluid through an inlet port 40 and adapted to return fluid through an outlet port 42. The fluid flow path schematically indicated in FIG. 3 at 44 is indicated to run inside the bag from the inlet port to the outlet port and passes through the filter element 14. This provides for an unfiltered fluid chamber 46 for unfiltered fluid between the bag and the filter element that is in fluid communication with the inlet port 40. In the case of an annular filter element 14 as illustrated, the unfiltered fluid chamber 46 generally surrounds the outside of the filter element 14 both at opposed ends and the annular space between the bag 12 and the filter element 14.

A filtered fluid chamber 48 is formed by the filter element with the filter element interposed between the unfiltered fluid chamber 46 and the filtered fluid chamber 48 such that fluid flowing along the fluid flow path 44 passes through the filter media 15 of the filter element for removal of contaminants. The outlet port is in fluid communication with the filtered fluid chamber 48 which in this case is formed by a central internal cavity 50 formed within the filter element 14.

In a preferred embodiment, the bag 12 is impermeable to the fluid being filtered and thereby provides a flexible housing for trapping unfiltered fluid on the upstream side between the filter element and the bag in the unfiltered fluid chamber 46.

As shown, the bag 12 is preferably impermeable and nonporous to the fluid which is being filtered, typically a liquid in preferred embodiments. The bag can be formed from a single sheet 52 of impermeable and flexible plastic material, that may comprise one or more layers and as shown in FIG. 5 that in an embodiment may include a total of three layers 54, 55, 56. The different layers 54, 55, 56 may be provided for a variety of reasons. While one layer may be sufficient in some applications preferably at least two layers and in some applications three layers are provided. In the illustrated embodiment shown in FIG. 5, a contact barrier layer 54 prevents liquid from escaping from within the bag, a gas impermeable layer 55 prevents the migration of air or other gas inside the bag which can prevent oxidation of the liquid being filtered, and a structural support layer 56 (that may or may not be impermeable) is provided to maintain the structural integrity of the bag such as when the bag is removed while full of liquid from the support housing assembly 16. As such, the structural support layer 56 preferably forms the outermost layer of the plastic sheet 52 which forms the bag.

The bag 12 can be made by folding the plastic sheet 52 to provide for the enclosure structure. Specifically, the sides of the plastic sheet 52 can be seamed together along vertical seams 58 which may be provided by welding the plastic material together which sealingly connects and prevents passage of fluid along the vertical seams 58. Similarly, the opposed edges or ends of the plastic sheet 52 may be joined via a plastic weld along a horizontal seam 60 that sealingly connects the opposed edges of the plastic sheet 52. In this manner, a fluid impermeable enclosure is provided that acts as a flexible housing that can conform in substantial shape to the support housing 18 in which it is eventually situated.

Figure 2:
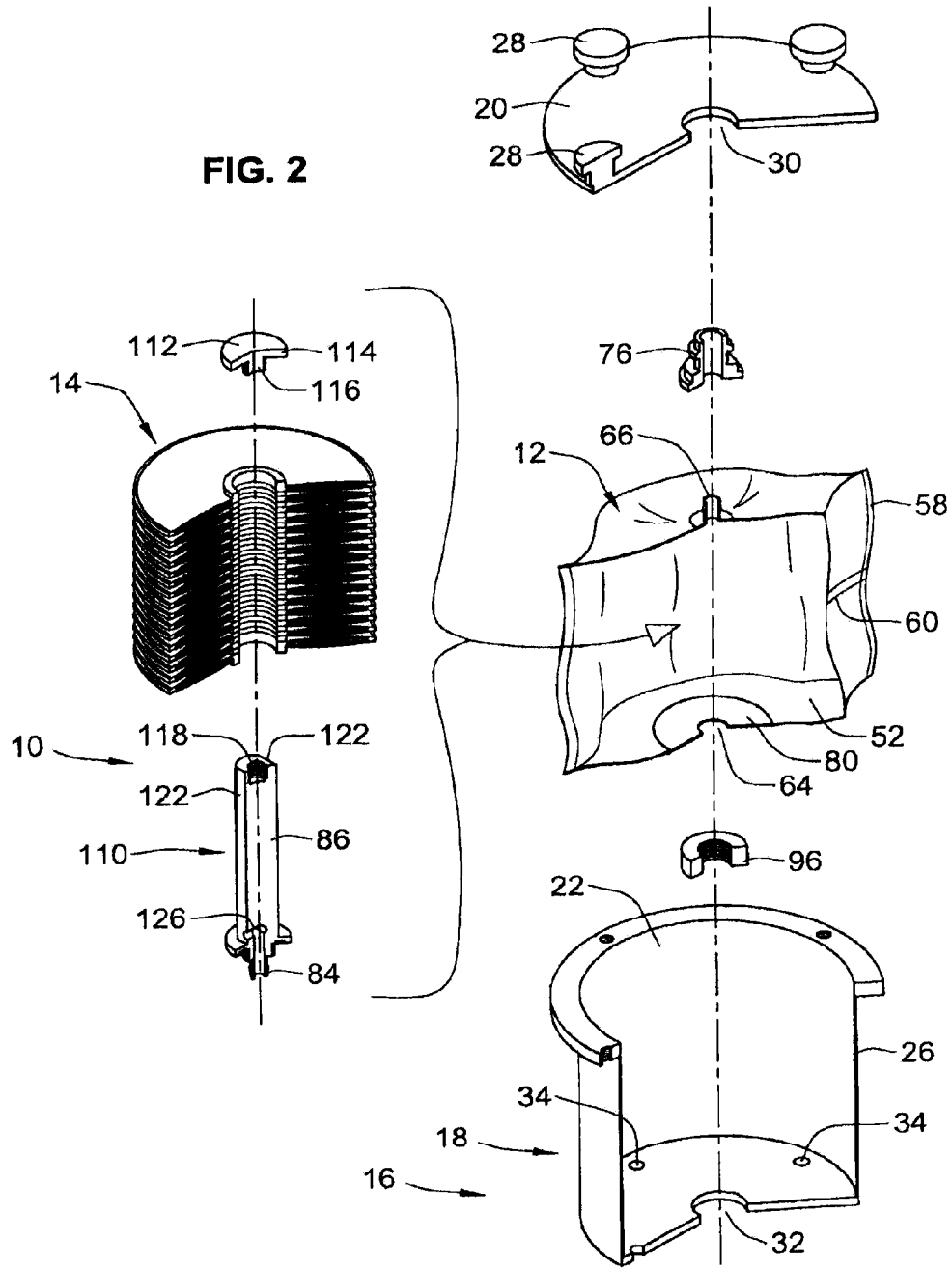
FIG. 2 is a similar exploded view to that of FIG. 1 except showing a partial cutaway cross-sectional view of the components.

With continued reference to FIGS. 3 and 5, to provide for fluid flow into and out of the bag 12, the bag includes inlet and outlet openings 62, 64 (see also e.g. FIG. 2 for outlet opening 64) at opposed top and bottom ends of the bag, respectively. The inlet port 40 extends through the inlet opening 62 and the outlet port 42 similarly extends through the outlet opening 44 to provide for fluid communication along the fluid flow path 44.

An inlet fitting 66 provides for the inlet port 40. As shown, the inlet fitting 66 is connectively sealed to the bag 12 around the inlet opening 62 of the bag. In one embodiment, the inlet fitting may comprise a molded plastic member that integrally provides an annular disc 68 that is plastically welded and sealed to the bag along an annular weld ring 70. A tubular hose barb projection 72 projects from the annular disc 68. The hose barb projection 72 includes a hose barb which provides for attachment to an inlet hose 74. It will be appreciated that the fitting may alternatively be other structures such as a screw thread, fluid coupling or other surface that is adapted to mate with an upstream conduit (including simply a smooth surface). A reusable inlet coupler 76 may be provided with the support housing assembly 16 for purposes of ensuring a sealing connection between the inlet conduit or hose 74 and the inlet fitting 66, when in use.

At the outlet end of the bag, a plastic annular disc 80 is integrally joined to the bag in surrounding relation of the outlet opening 64. The annular disc 80 may be joined in a sealing manner to the bag 12 by one and preferably at least two annular plastic weld rings 82 in which the plastic material of the annular disc 80 and the bag are joined and bonded together. The inner periphery of the annular disc 80 provides a substantial flange region for sealing engagement. To provide for the outlet port 42, an outlet fitting 84 is provided. The outlet fitting in the illustrated embodiment may be connected or integrally provided with a support core 86 that extends up into the filter element 14. The outlet fitting 84, in any event, is fluidically connected to the filtered fluid chamber 48 so as to drain filtrate that has passed through the filter element 14. In this embodiment, the outlet fitting includes a tubular hose barb projection 88 that integrally extends from an annular support flange 90. As in the case of the inlet fitting, the hose barb projection 88 provides a hose barb (or other suitable fitting structures such as threads, fluid coupling, smooth surface, etc.) that connects with an outlet conduit such as an outlet hose 92 to thereby outlet filtered fluid from the filter cartridge 12.

Between the barb fitting and the annular flange is interposed a threaded section 94 that threadingly receives a nut 96. The nut 96 can be screwed onto the outlet fitting 84 and thereby squeeze and compress the annular disc 80 of the bag and thereby provide for an axial compression seal at that location. Preferably, the support flange 90 provides for seal members such as integrally projecting annular ribs or otherwise gaskets 98 that provide for seals along the inner periphery of the bag and prevent for seepage of fluid along this location. By having a projecting structure such as integral plastic rib and/or gasket, the compression can be directed to those locations and thereby provide for axial compression sealing. The nut 96 may alternatively be joined in any other manner such as ultrasonic plastic welding, adhesively bonded or otherwise permanently secured to the outlet fitting 84 such that threading is not necessarily required. Further, a permanent connection of the nut 96 can prevent the nut 96 from backing off during use.

Turning in greater detail to the filter element, it should be noted that any type of filter element may potentially be used to include radial flow elements, axial flow elements, or other such elements depending upon the application. One preferred and particularly useful form in terms of an embodiment of the present invention is an annular filter element as illustrated that defines and provides for a central internal cavity 50 in which the filter media 15 separates the filtered side from the unfiltered side. One end of the annular filter media element may be closed (either integrally or by a separate member) while the other end can be open to provide for a regular predetermined flow path from the outside to the inside according to an embodiment and flow path illustrated, for example, in FIG. 3.

For example, the filter media element may include a plurality of filter discs 100 each containing sheets of filter media 15 such as a combination of adsorption and depth loading filtration media or doing a combination of filtration including particulate filtration as well as adsorption of undesirable molecules on a microscopic level. For example, the filter discs may be any of the DEPTH-CLEAR series filter media discs, that are commercially available from the present assignee, Purolator Liquid Process. In such a filter element arrangement, the filter discs 100 are stacked in a stack with adjacent filter discs being separated by spacer webs (also known as center separators) 102 and also along the inner periphery by rigid plastic sealing spacer rings 104. The outside of the filter discs 100 may be joined by seal rings 106. Between adjacent filter discs 100 and around the spacer webs (center separators) 102 are provided flow passages that drain filtered fluid into the open central internal cavity 50 defined within the filter element 14.

The stack of filter discs 100 may be retained together by retainer clips (not shown) that are provided along the inner periphery of the filter discs that hold the multiple filter discs together in the stack. Additionally, a support core assembly 110 is provided to secure and support the filter element 14 within the bag 12. As shown, the support core assembly 110 secures the filter element 14 to the outlet end of the bag, whereas the inlet fitting 66 is freely carried by the bag 12 and freely movable relative to the filter element through the flexibility afforded by the bag 12. As a result, this provides for easy installation of the inlet fitting as the relative inlet and outlet fittings can be moved relative to each other (with the outlet fitting 84 being fixed via the support core 86 to the filter element 14) and the inlet fitting 66 being freely movable through the flexibility of the plastic material of the bag 12.

The support core assembly generally includes several different portions including the support core 86, which may integrally provide for the outlet fitting 84 (either as a unitary one piece structure or alternatively two structures which are joined permanently or non-permanently together). Additionally, the support core assembly includes a compression load member 112 that acts on the end opposite the support flange 90. The support flange 90 thereby provides an opposing compression load member to that of compression load member 112. The compression load member 112 is movable axially relative to the support flange 90 and can be secured to apply a preset axial compression force to the sealing rings 104 along the inner periphery of the filter discs 100. The compression load member 112 also thereby firmly secures the filter element axially relative to the support core 86. The compression load member can then be joined to the support core 86 such as by way of a threaded attachment; or alternatively, away by means of welding such as infrared or ultrasonic welding done while a preset axial load is applied to the stack of filter discs.

In the present embodiment, the compression load member is shown to have a threaded connection such that screwing rotation of the compression load member 112 incrementally moves the threaded load member relative to the support flange to apply a preset axial compression force limited dimensionally by the support core (tightening to a predetermined position). In one embodiment, the compression load member 112 may include a flange 114 that engages the end sealing ring and thereby closes off the upper end of the filter element and a threaded stem 116 that is received into a threaded opening 118 formed at the axial end of the support core. Preferably, flange 114 and support flange 90 each include an integral axially projecting annular rib 120 that concentrates the force and provides an annular sealing contact against the end sealing rings 104 thereby preventing fluid leakage around the ends.

The support core 86 is substantially solid but does include a non-circular periphery with at least one and preferably multiple recessed regions such as flats 122 along the periphery. The flats 122 in combination with the inner circular periphery of the internal cavity 50 of the filter element provides flow channels 124 to facilitate flow of filtered fluid toward the outlet port 42. Radial passages 126 toward the bottom end connect the flow channels 124 to a central axial passage that extends through the support flange and forms the outlet port 42.

With this arrangement, the filter cartridge 110 provides for a method for filtering fluid which includes inletting unfiltered fluid into the bag 12 through the inlet port 40. The unfiltered fluid can then flow through the filter media element 14 whereby it is filtered creating filtered fluid. Then the filtered fluid can then be outlet through the outlet port 42. The filter cartridge also completely encases the filter media element 14 within the bag 12 with the inlet fitting sealingly attached to the bag for inletting filtered fluid and the outlet fitting sealingly attached to the bag for outletting filtered fluid.

The present embodiment also provides for a clean change out that does not require cleaning of the surrounding support housing assembly 16. For example, replacement is made easy in that while the inlet and outlet conduits are shut off (e.g. via valves not shown), the filter cartridge 10 can be changed by disconnecting the inlet and outlet fittings and removing the filter cartridge with unfiltered fluid still remaining in the bag. Thereafter, a new filter cartridge comprising a new bag and encasing a new filter media element along with new inlet and outlet fittings can be provided and reconnected to the inlet and outlet conduits. A further advantage is that the core also can provide for structure for pre-compressing the stack of filter discs 100 when in the bag when that type of a filter media element is chosen. Further, the present invention can also be used with existing systems that employ stainless steel support housing with few modifications and thus not only act as a retrofit to providing cleanly replacement for existing applications, but also provide for applications and new systems as well.

An advantage of the present embodiment is that it isolates leaks from the filtrate. If there were a leak in the bag or between the core and the bag, the filtered fluid (filtrate) is isolated in the outlet port and the unfiltered fluid would not contaminate the filtrate. Instead the unfiltered fluid could spill onto the floor through the central exit opening in the support housing.

Various other advantages and features may be provided. For new applications, the support housing assembly can be made of less expensive materials such as using flat and rolled sheet metal for its constructions. Due to the bag enclosure of the filter, there are no sealing requirements and therefore no o-rings or valves that can fail. Further, the housings may be stackable and stacked on top of each other for expansion.

With reference to FIGS. 6-11, a second embodiment of a filter assembly is illustrated and includes a filter in the form of a filter cartridge 200, that includes an enclosure in the form of a containment bag, such as a bag 202, that encloses a filter element 204 (also referred to as filter media element). The filter element 204 includes suitable filter media 206 that provides barrier/surface loading filtration, depth filtration, adsorption filtration, and/or combinations thereof. In various embodiments, the filter media 206 may include any suitable number of layers (e.g., four, etc.). The filter cartridge 200 can be installed in a support housing assembly 208, and thereby provides for a filter assembly (e.g., a combination of the filter and the support housing assembly 208).

The filter cartridge 200 and the filter cartridge 10 include many similarities. Therefore, in the following description of the filter cartridge 200, differences from the filter cartridge 10 are the focus of the description below. Features of the filter cartridge 200 not discussed below may be similar to features of the filter cartridge 10 described above.

Similarly, the support housing assembly 208 and the support housing assembly 16 also include many similarities. The description of the support housing assembly 208 also focuses on differences from the support housing assembly 16. Features of the support housing assembly 208 not discussed below may be similar to features of the support housing assembly 16 described above.

In one embodiment, the filter assembly also includes a carrier bag, such as an open-topped bag 210, which may receive the filter cartridge 200 therein, and which, with the filter cartridge 200 therein, may be placed in the support housing assembly 208. The open-topped bag 210 may also be adapted to be used by a user to facilitate removal of the filter cartridge 200 from the support housing assembly 208.

Generally, an embodiment of the open-topped bag 210 is described, followed by a description of an embodiment of the support housing assembly 208, including a description of an embodiment of a split lid, followed by a description of an embodiment of the filter cartridge 200.

Figure 6:
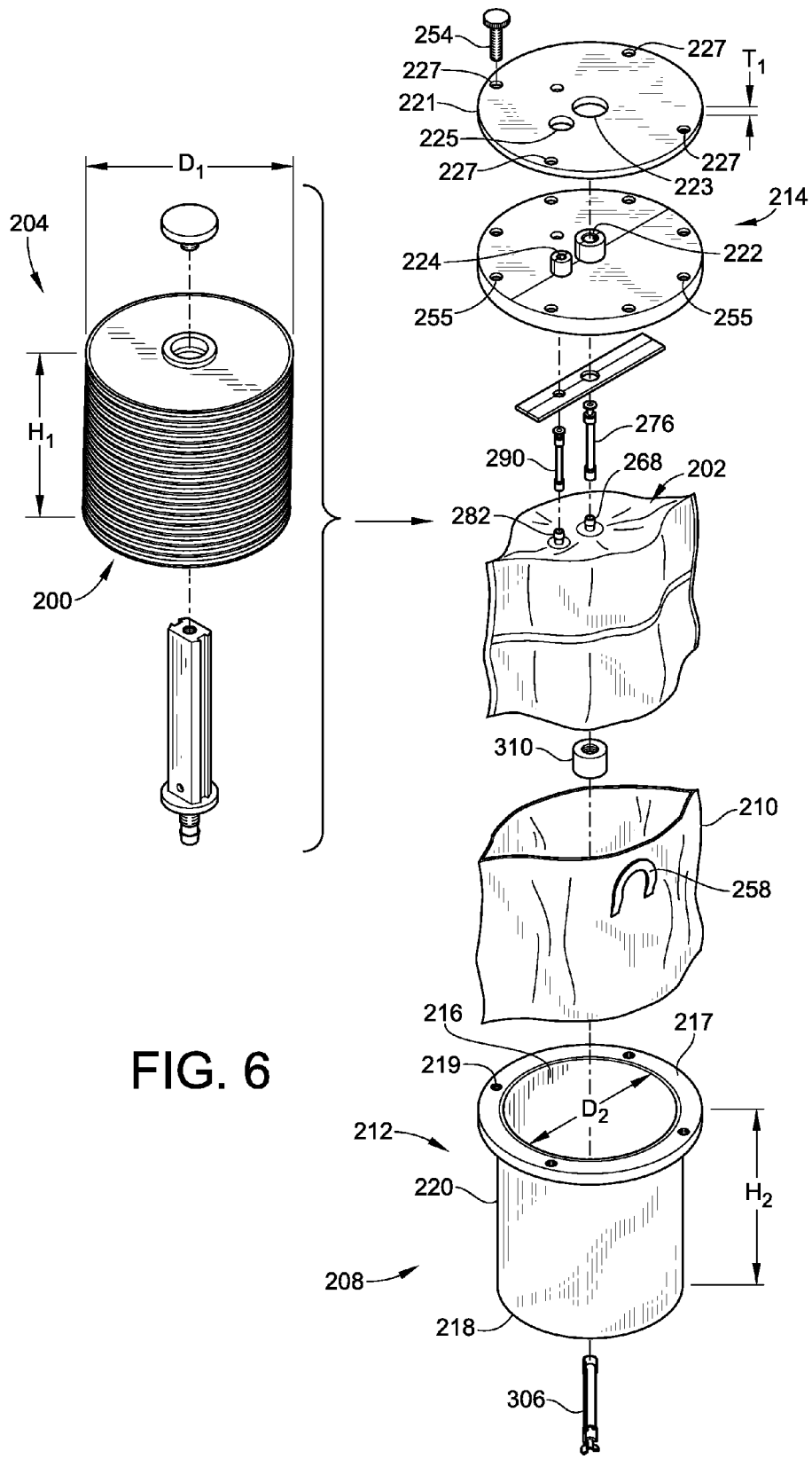
FIG. 6 is an exploded isometric view of the components of a filter assembly including a filter in combination with a filter support housing, in accordance with a second embodiment of the present invention.

With further reference to FIG. 6, the open-topped bag 210 is an enclosure with an open top sized to receive the filter cartridge 200 therein. The filter cartridge 200 can then be carried and, along with the open-topped bag 210 placed in the support housing 212. In one embodiment the open-topped bag 210 is formed from material that is both flexible and fluid impermeable. The open-topped bag 210 may including a single layer of material or multiple layers of material. The open-topped bag 210 may be formed from any suitable material, such as, e.g., various plastics, heavy polyester, polyester fibers, polyethylene terephthalate, vinyl, nylon, rubber, etc. In one embodiment, the open-topped bag 210 also includes a handle 258. The handle 258 may be integrally formed with the open-topped bag 210 or may be attached to the open-topped bag 210 by any suitable mechanism, such as, e.g., heat welding, thermoplastic welding, attachment with adhesive, etc. The handle 258 may be formed from the same material as the open-topped bag 210 or may be formed from a different suitable material, such as, for example, various plastics, vinyl, nylon, rubber, etc. The handle 258 is arranged with respect to the open-topped bag 210 such that the open-topped bag 210 carrying the filter cartridge 202 may be easily maneuvered by a user grasping the handle. In one embodiment, the open-topped bag 210 includes a second handle generally on the opposite side of the open-topped bag 210 from the handle 258 to allow for two-handed carrying and maneuvering of the open-topped bag 210. In one embodiment, the open-topped bag 210 is designed to be of strong and sturdy construction and to carry at least 100 pounds therein without failure or breakage of the open-topped bag 210 or the handle 258. In one embodiment, the open-topped bag 210 is sized with generally the same dimensions as the interior of the support housing 212.

Figure 7:
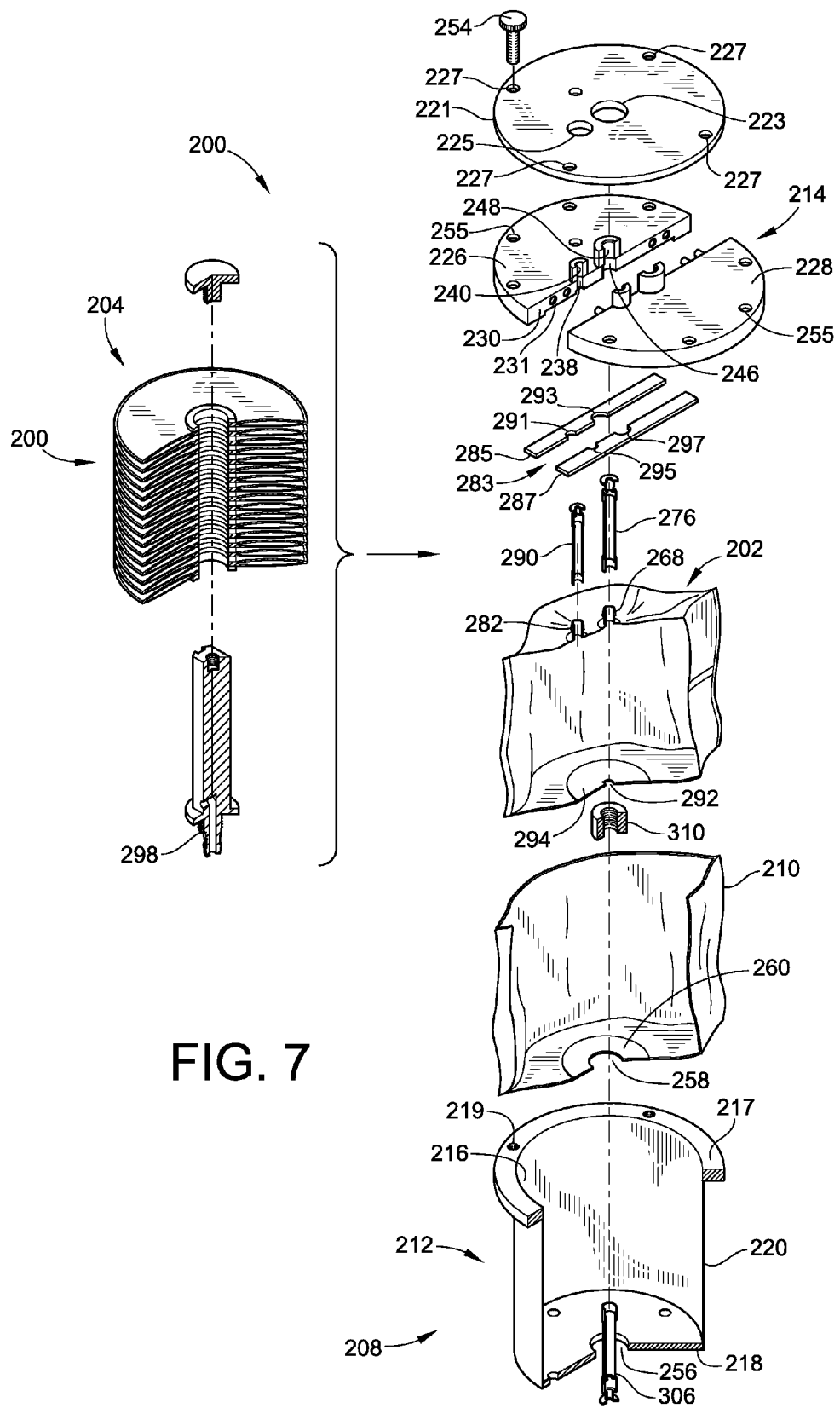
FIG. 7 is a similar exploded view to that of FIG. 6 except showing a partial cutaway cross-sectional view of the components.
Figure 9:
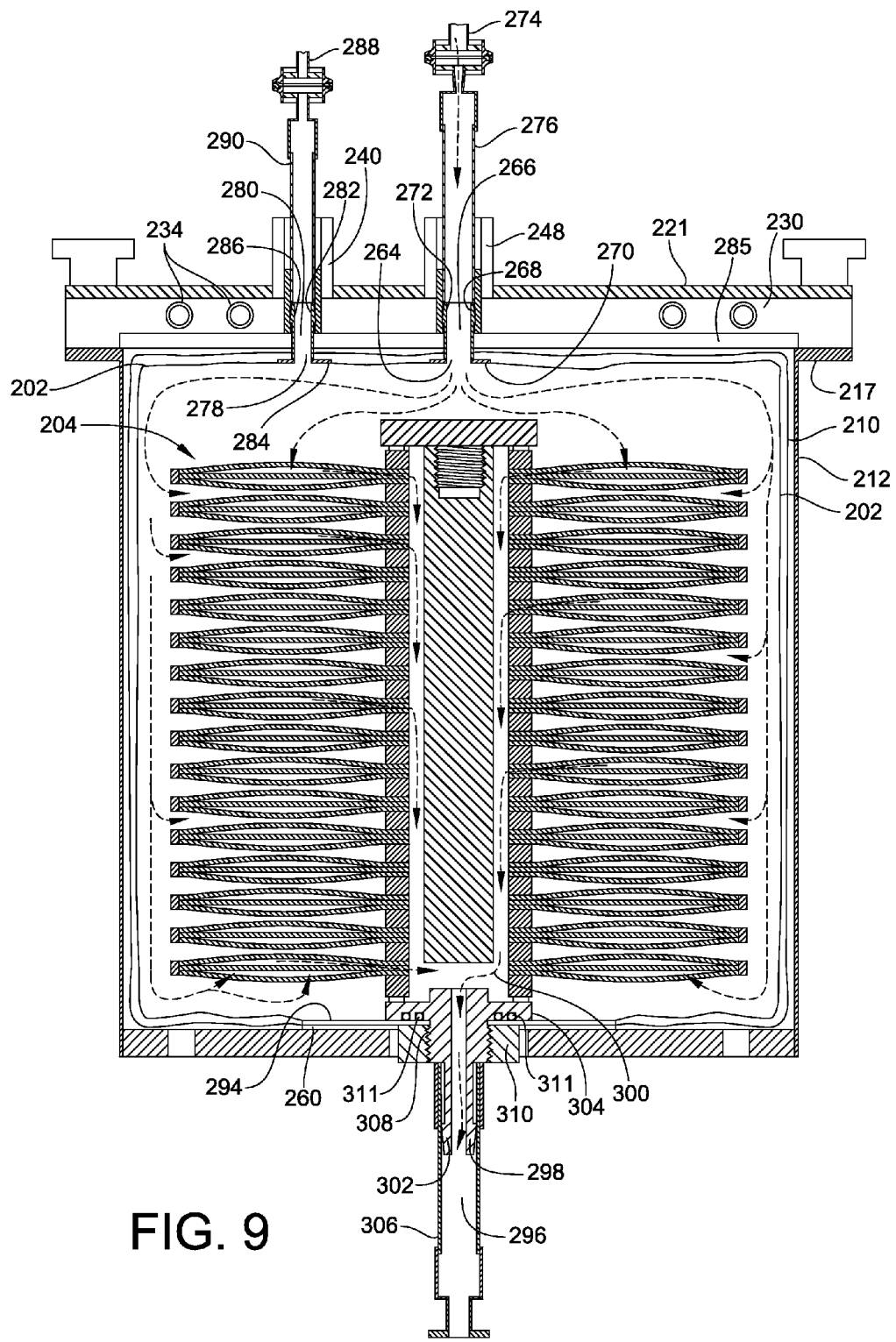
FIG. 9 is a cross section of the filter assembly shown in FIGS. 6 and 7 in an assembled state with fluid flow paths indicated.
Figure 10:
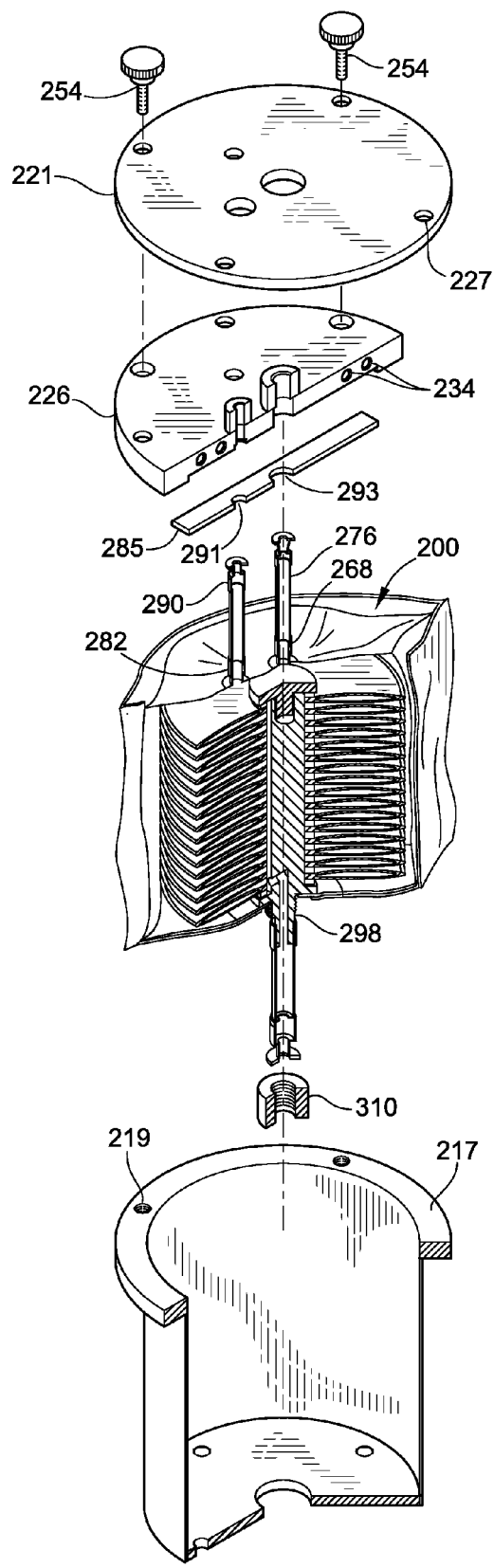
FIG. 10 is a partial cutaway cross-sectional isometric view of the assembled filter of FIGS. 6-9 to illustrate how it is installed within a support housing in which the support housing is shown in exploded view.

With further reference to FIG. 7, the open-topped bag 210 includes an outlet aperture 258 defined in the bottom of the open-topped bag 210. A plastic annular disc 260 is integrally coupled with the open-topped bag 210 in surrounding relation with the outlet aperture 258. The annular disc 260 may be joined in a sealing manner to the open-topped bag 210 by one or more annular plastic weld rings in which the material of the open-topped bag 210 and the annular disc 260 are bonded together. The outlet aperture 258 is sized to allow a nut 310 and a portion of the outlet fitting 298 to pass therethrough, as illustrated in FIG. 9 and further described below.

Before turning to the details of the filter cartridge 200, a further description of an embodiment of the support housing assembly 208 is provided. With reference to FIGS. 6 and 7, the support housing assembly 208 includes a support housing 212 and a split lid 214 that closes the open end 216 of the support housing 212. As illustrated, the support housing 212 is generally a bowl-like member, including a disc-like base 218 and an annular and axially extending cylindrical side wall 220 extending vertically upward from the base 218 to define the open end 216. The open end 216 is sized to receive the filter cartridge 200 and, in one embodiment, the open-topped bag 210 containing the filter cartridge 200, through the open end 216. Extending radially outwardly from the upper end of the cylindrical side wall 220 is a radially extending flange 217. The radially extending flange 217 defines a plurality of threaded apertures 219. The threaded apertures 219 are configured to receive and cooperatively threadingly engage the downwardly projecting threaded portions of fastener knobs 254, allowing the fastener knobs 254 to secure the split lid 214 to the support housing 212. In one embodiment the support housing 212 may be formed from polypropylene. In another embodiment the support housing 212 may be formed from metal, such as, for example, stainless steel. The support housing 212 may be formed from any corrosion resistant material capable of withstanding pressure, e.g., corrosion resistant steel, fiber reinforced plastic, etc.

The filter element 204 has an outer diameter $D_1$. The support housing 212 has an inner diameter $D_2$. In one embodiment the inner diameter $D_2$ is between approximately 8 inches and 16 inches. In another embodiment the inner diameter $D_2$ is between approximately 10 inches and 14 inches. In another embodiment the inner diameter $D_2$ is approximately 12 inches. The filter element 204 and support housing 212 are sized such that outer diameter $D_1$ is smaller than inner diameter $D_2$ and that the support housing 212 is sized to support the filter cartridge 200. Additionally, the support housing 212, with its inner diameter $D_2$, is configured such that the bag 202 is supported by the surface of the sidewall 220 and the base 218 when the interior of the bag 202 is under pressure during filtering providing strength and allowing for filtering processes which place the interior of the bag 202 at pressures in one embodiment of up to approximately 40 PSI (pounds per square inch) and in another embodiment at pressure of up to approximately 100 PSI.

The filter element 204 has a height $H_1$. The support housing 212 has a height $H_2$. In one embodiment the height $H_2$ is between approximately 20 inches and 30 inches. In another embodiment the height $H_2$ is between approximately 22 inches and 26 inches. In another embodiment the height $H_2$ is approximately 24 inches. The filter element 204 and the support housing 212 are sized such that the filter element 204 may fit within the support housing 212, with the inlet 269 and vent 282 fittings located proximate the cover 214 and disposed in the apertures defined therein, as will be further described below.

The split lid 214 is configured to seal the open end 216 of the support housing 212. As illustrated in FIG. 6, the split lid 214 defines an inlet aperture 222 and a vent aperture 224, spaced apart from the inlet aperture 224. The inlet aperture 222 is configured to receive an inlet fitting, as will be further described below, to allow unfiltered fluid to flow into the support housing assembly 208. The vent aperture 224 is configured to receive a vent fitting, as will be further described below, to allow gas to escape from the bag 202 from the support housing assembly 208.

Figure 8A:
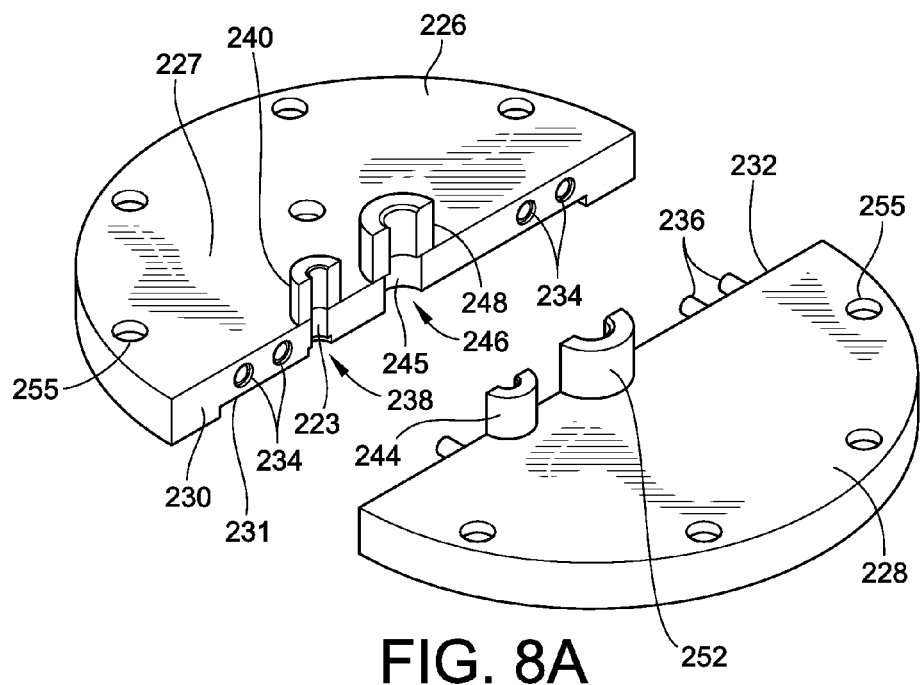
FIG. 8A is an exploded view of a split lid of the support housing of FIGS. 6 and 7.
Figure 8B:
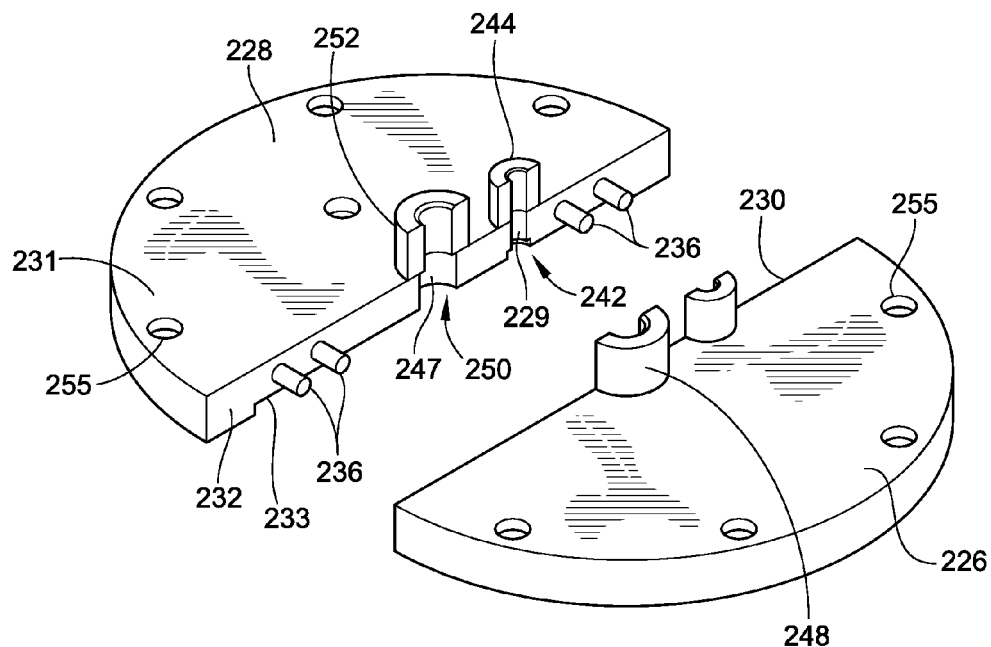
FIG. 8B is an exploded view of the split lid of FIG. 8A from the opposite side.

With reference to FIGS. 7, 8A, and 8B, in one embodiment, the split lid 214 includes a first lid portion 226 and a second lid portion 228. The first and second lid portions 226 and 228 are generally semi-circularly disc-shaped and are configured to cooperatively fit to form a generally circular disc, sized to close the open end 216 of the support housing 212. The first lid portion 226 includes a generally vertical wall portion 230, which, when the split lid 214 is assembled, is configured to abut a matching generally vertical wall portion 232 of the second lid portion 228.

As best illustrated in FIG. 8A, the generally vertical wall portion 230 of the first lid portion 226 includes a plurality of projection receiving apertures 234 extending generally perpendicularly to the generally vertical wall portion 230 into the first lid portion 226. As best illustrated in FIG. 8B, the generally vertical wall portion 232 of the second lid portion 228 includes a plurality of projections 236 extending from the generally vertical wall portion 232 generally transversely thereto. The projections 236 are arranged and shaped to match and be received by the projection receiving apertures 234 of the first lid portion 226 to releasably join the second lid portion 228 to the first lid portion 226 to form the split lid 214. While four projection receiving apertures 234 and four projections 236 are illustrated in FIGS. 7, 8A, and 8B, any suitable number of projections 236 and projection receiving apertures 234 may be provided. Additionally, other suitable mechanisms for joining the first lid portion 226 with the second lid portion 228 may also be used. Additionally, in other embodiments, the split lid may be formed from various other suitable numbers of releasably coupling, matching, or interfitting lid portions.

With reference to FIG. 8A, the generally vertical wall portion 230 includes a semi-cylindrical recessed portion 223. The first lid portion 226 also includes a top surface 227 extending generally transversely from the generally vertical wall portion 230. Extending upwardly from the top surface 227 of the first lid portion 226 is a semi-cylindrical vent wall 240. The interior surface of the semi-cylindrical vent wall 240 is aligned with the recessed portion 223 of the generally vertical wall portion 230. The semi-cylindrical vent wall 240 and the recessed portion 223 of the generally vertical wall portion 230 together define a semi-cylindrical vent aperture 238.

With reference to FIG. 8B, the generally vertical wall portion 232 of the second lid portion 228 also includes a semi-cylindrical recessed portion 229. The second lid portion 228 also includes a top surface 231 extending generally transversely from the generally vertical wall portion 232. Extending upwardly from the top surface 231 of second lid portion 228 is another semi-cylindrical vent wall 244, the interior surface of which is aligned with the recessed portion 229 of the generally vertical wall portion 232. The semi-cylindrical vent wall 244 and the recessed portion 229 of the generally vertical wall portion 230 together define another semi-cylindrical vent aperture 242.

With reference to FIGS. 8A and 8B, the first and second lid portions 226 and 228 are arranged such that when they are joined to assemble the split lid 214, the surfaces defining the semi-cylindrical vent apertures 238 and 242, i.e., the interior surfaces of the semi-cylindrical vent walls 240 and 244 and the recessed portions 223 and 229, align to together define the vent aperture 224 illustrated in FIG. 6.

With further reference to FIG. 8A, the generally vertical wall portion 230 includes a semi-cylindrical recessed portion 245, spaced apart from the semi-cylindrical recessed portion 223. Extending upwardly from the top surface 227 of the first lid portion 226 is a semi-cylindrical inlet wall 248, the interior surface of which is aligned with the semi-cylindrical recessed portion 245 of the generally vertical wall portion 230. The interior surface of the semi-cylindrical inlet wall 248 and the semi-cylindrical recessed portion 245 together define a semi-cylindrical inlet aperture 246, spaced apart from the semi-cylindrical vent aperture 238.

With reference to FIG. 8B, the generally vertical wall portion 232 of the second lid portion 228 also includes a semi-cylindrical recessed portion 247, spaced apart from the semi-cylindrical recessed portion 229. Extending upwardly from the top surface 231 of the second lid portion 228 is another semi-cylindrical inlet wall 252, the interior surface of which is aligned with the semi-cylindrical recessed portion 247 of the generally vertical wall portion 232. The interior surface of the semi-cylindrical inlet wall 252 and the semi-cylindrical recessed portion 247 together define a semi-cylindrical inlet aperture 250.

With reference to FIGS. 8A and 8B, the first and second lid portions 226 and 228 are arranged such that when they are joined to assemble the split lid 214, the surfaces defining the semi-cylindrical inlet apertures 246 and 250, i.e., the interior surfaces of the semi-cylindrical inlet walls 248 and 252 and the semi-cylindrical recessed portions 245 and 247 align to together form the inlet aperture 222 illustrated in FIG. 6.

As is illustrated in FIGS. 7, 8A, and 8B, the first lid portion 226 includes a generally rectangular cutout portion 231 spanning along of a portion of the generally vertical wall portion 230, on a side of the generally vertical wall portion 230 distal from the top surface 227. As can be seen in FIG. 8B, the second lid portion 228 includes a similar, matching cutout portion 233.

With reference to FIGS. 7, 8A, and 8B, a split slat portion 283 is provided. The split slat portion 283 includes a first portion 285, adapted to be received into the generally rectangular cutout 231 of the first lid portion 226, and a second portion 287, adapted to be received into the rectangular cutout 233 of the second lid portion 228. The first portion 285 includes in its face proximate the second portion 287, a first recessed wall portion 291 and a second recessed wall portion 293 spaced apart from the first recessed wall portion 291. The second portion 287 includes in its face proximate the first portion 285 a first recessed wall portion 295 and a second recessed wall portion 297 spaced apart from the first recessed wall portion 295. The first recessed wall portions 291 and 295 are cooperatively arranged such that when the first portion 285 and the second portion 287 are received into the cutouts 231 and 233 in the first lid portion 226 and the second lid portion 228 respectively, and the first and second lid portions 226 and 228 are placed to cover the opening 216 in the support housing 212, the first recessed wall portions 291 and 295 cooperatively form an aperture, such that the vent aperture 224 is not blocked by the split slat portion 283 and remains accessible. Similarly, the second recessed wall portions 293 and 297 are cooperatively arranged such that when the first portion 285 and the second portion 287 are received into the cutouts in the first lid portion 226 and the second lid portion 228 respectively, and the first and second lid portions 226 and 228 are placed to cover the opening 216 in the support housing 212, the second recessed wall portions 293 and 297 cooperatively form an aperture, such that the inlet aperture 222 is not blocked by the split slat portion 283 and remains accessible. The first and second split slat portions 285 and 287 may be welded to the first and second lid portions 226 and 228 respectively or joined to the lid portions 226 and 228 by any other mechanism known in the art (e.g., adhesive, interference fit, etc.).

With further reference to FIG. 7, the support housing assembly 208 also includes a cover lid portion 221. The cover lid portion 221 is generally disc-shaped. The cover lid portion 402 defines a plurality of attachment apertures 227 spaced apart about proximate its radial periphery. In one embodiment the cover lid portion 402 defines threading lining the attachment apertures 227. In another embodiment the cover lid portion 402 does not define threading and defines a generally uniform surface lining the attachment apertures 227. The cover lid portion 221 also includes an inlet aperture 223 and a vent aperture 225 spaced apart from the inlet aperture 223. The inlet aperture 223 is sized such that the semi-cylindrical inlet walls 248 and 250, when the split lid 214 is in an assembled configuration, may pass through the inlet aperture 223 of the cover lid portion 221. The vent aperture 225 of the cover lid portion 221 is sized such that the semi-cylindrical vent walls 240 and 244, when the split lid 214 is in an assembled configuration, may pass through the vent aperture 225 of the cover lid portion 221.

The cover lid portion 221 has a thickness $T_1$. In one embodiment, the thickness $T_1$ is between approximately 0.5 inches and 3.0 inches. In another embodiment, the thickness $T_1$ is between approximately 1.0 inches and 2.0 inches. In another embodiment, the thickness $T_1$ is approximately 1.5 inches. In one embodiment, the cover lid portion 221 is formed from polypropylene. However, in other embodiments, the cover lid portion 221 may be formed from metal (e.g., stainless steel), suitable plastics, or any other suitable material. The cover lid portion 221 is configured to provide support to the split lid 214 during filtering.

Returning to FIG. 6, in one embodiment, the fastener knobs 254 include a bolt portion having an outer threaded periphery. The bolt portion passes through an attachment aperture 227 in the cover lid portion 221, through a threaded attachment aperture 255, releasably threadingly engaging with the attachment aperture 255 of the split lid 214 and through a threaded aperture 219 defined in the flange 217 of the support housing 212, releasably threadingly engaging therewith to secure the cover lid portion 221 and the split lid 214 to the support housing 212.

With reference to FIG. 7, the base 218 of the support housing 212 includes an exit port 256 to accommodate fluid flow out of the filter cartridge 200 and the support housing 212. In one embodiment, the support housing 212 and split lid 214 may be formed from stainless steel material or other rigid material such as, for example, rolled sheet metal, molded plastics, polypropylene, etc., that adequately provide support to the bag 202 of the filter cartridge 200 when it is filled with fluid, such as liquid. The support housing 212, similar to the support housing 18 of the previous embodiment described above, generally carries the weight of the filter cartridge 200, including the liquid contained therein and supports the bag 202 against fluid pressure that is exerted in the filter cartridge 200. As in the previous embodiment, vent openings may be provided in the support housing 212.

With reference to FIGS. 6-11, the filter cartridge 200 is described.

With specific reference to FIG. 9, the filter cartridge 200, as in the previous embodiment, includes an inlet opening 264. The bag 202 is adapted to receive fluid through an inlet port 266. The inlet port 266 extends through the inlet opening 264. An inlet fitting 268 provides for the inlet port 266. The inlet fitting 268 is connectively sealed to the bag 202 around the inlet opening 264 of the bag 202. In one embodiment the inlet fitting 268 may include a molded plastic member that provides an annular disc 270. A tubular hose barb projection 272 projects from the annular disc 270. The hose barb projection 272 includes a hose barb which provides for attachment to an inlet hose 274 by a sleeve and collet mechanism 276, such as, for example a BARBLOCK® sleeve and collet mechanism sold by Barblock Corporation. The use of other sleeve and collet mechanisms is also envisioned. It will be appreciated that the fitting may alternatively be other structures such as a screw thread, fluid coupling or other surface that is adapted to mate with an upstream conduit (including simply a smooth surface). The sleeve and collet mechanism 276 provides a sealing connection between the inlet conduit or hose 274 and the inlet fitting 268 when in use.

With further reference to FIG. 9, the filter cartridge 202 also includes a vent opening 278. In one embodiment, the vent opening 278 is spaced apart from the inlet opening 264. Generally, the vent opening 278 is provided such that during times in which pressure within the bag 202 is increased, e.g., when fluid begins to enter the bag 202 through the inlet opening 264, the vent opening 278 may be used to vent gas from the bag 202 as the fluid enters the bag 202. The bag 202 is adapted to vent through a vent port 280. The vent port 280 extends through the vent opening 278. A vent fitting 282 provides for the vent port 280. The vent fitting 282 is connectively sealed to the bag 202 around the vent opening 278 of the bag 202. In one embodiment the vent fitting 282 may include a molded plastic member that provides an annular disc 284. A tubular hose barb projection 286 projects from the annular disc 284. The hose barb projection 286 includes a hose barb which provides for attachment to a vent hose 288 by a sleeve and collet mechanism 290. It will be appreciated that the fitting may alternatively be other structures such as a screw thread, fluid coupling or other surface that is adapted to mate with an upstream conduit (including simply a smooth surface). The sleeve and collet mechanism 290 provides a sealing connection between the vent conduit or hose 288 and the vent fitting 282 when in use.

While the vent fitting 282 is illustrated in the drawings as smaller than the inlet fitting 268, each fitting may be any suitable size relative to one another. The vent fitting 282 is illustrated as located spaced apart from, proximate to the inlet fitting 268 on the bag 202. In other embodiments, the vent fitting 282 is located in other suitable locations relative to the inlet fitting 268.

Venting of gas from the interior of the bag 202 through the vent fitting 282 and out to the vent hose 288 may be controlled by a suitable valve, e.g., an on/off valve, which may be manually or electronically actuatable between open and closed configurations. In one embodiment, upon entry of fluid through the inlet opening 264 into the bag 202, a user may open the suitable valve and allow gas to escape from the interior of the bag for a suitable period of time and then close the suitable valve.

With further reference to FIGS. 6-11, the inlet fitting 268 and the vent fitting 282 project upwardly from the bag 202. When the bag 202 is located in the support housing 212, with the fittings 268 and 282 projecting upwardly, the first and second lid portions 226 and 228 of the split lid 214 can be moved together such that the vent fitting 282 (and a portion of the sleeve and collet mechanism 290) is disposed within the vent aperture 224 and the inlet fitting 268 (and a portion of the sleeve and collet mechanism 276) is disposed within the inlet aperture 222 when the generally vertical wall portions 230 and 232 of the first and second lid portions 226 and 228 are placed in abutting relationship to close the open end 216 of the support housing 212. In one embodiment the fittings 268 and 282, with portions of the sleeve and collet mechanisms 276 and 290, may fit securely within the apertures 222 and 224. In other embodiments, the inlet hose 274 may be placed within the inlet aperture 222 in fluid communication through the inlet fitting 268 with the inside of the bag 202. In other embodiments, the vent hose 288 may be placed within the vent aperture 224 in fluid communication through the vent fitting 282 with the inside of the bag 202.

With reference to FIGS. 7-11, similarly to the previous embodiment, the bag 202 includes an outlet aperture 292. A plastic annular disc 294 is integrally joined to the bag 202 in surrounding relation of the outlet aperture 292. The annular disc 294 may be joined in a sealing manner to the bag 202 similarly to the previous embodiment. The inner periphery of the annular disc 294 provides a substantial flange region for sealing engagement. The bag 202 is adapted to return fluid through an outlet port 296. To provide for the outlet port 296, an outlet fitting 298 is provided. The outlet fitting 298 is in fluid communication with the filtered fluid chamber 300. The outlet fitting 298 includes a tubular barb projection 302 that extends from an annular support flange 304. As in the case of the inlet fitting, the tubular barb projection 302 provides a hose barb (or other suitable fitting structures such as threads, fluid coupling, smooth surface, etc.) that connects with an outlet conduit such as an outlet hose, through, for example, a sleeve and collet mechanism 306 or other suitable mechanism, to thereby outlet filtered fluid from the filter cartridge 200.

Figure 11:
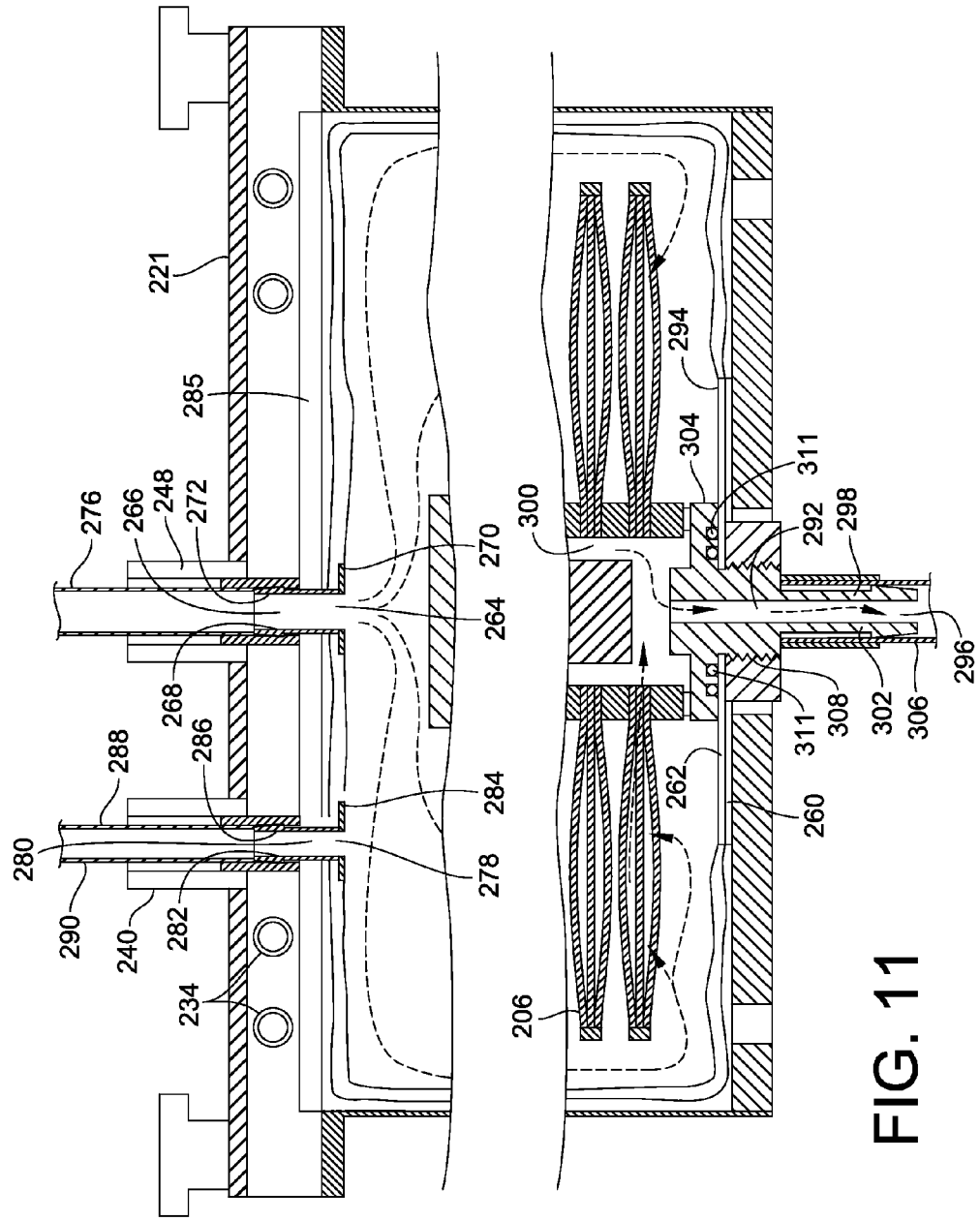
FIG. 11 is a enlarged view of the opposed ends of the filter assembly shown in FIG. 9 to better illustrate how the inlet fittings are attached to the bag.

As illustrated in FIGS. 9 and 11, between the barb fitting and the annular flange 304 is interposed a threaded section 308 that threadingly receives a nut 310. The nut 310 can be screwed onto the outlet fitting 298. As illustrated in FIGS. 9 and 11, as the nut 310 is screwed onto the outlet fitting 298 it thereby squeezes and compresses the annular disc 294 of the bag 202, providing for an axial compression seal at that location. In one embodiment, the outlet fitting includes a sealing element, in the illustrated embodiment a pair of radially spaced apart sealing elements, such as sealing gaskets, illustrated as O-rings 311. These O-rings may be compressed by the nut 310 forcing the annular disc 294 of the bag 202 against a portion of the outlet fitting 298, thus, allowing for a fluid-tight seal and assisting with prevention of leakage of unfiltered fluid from the interior of the bag 202 out of the bag 202. As in the previous embodiment, various other sealing mechanisms may be provided. In one embodiment, the nut 310 may be alternatively joined in any other manner with the outlet fitting 298 such as ultrasonic plastic welding, adhesively bonded, or otherwise secured to the outlet fitting such that threading is not necessarily required. In one embodiment, a permanent connection of the nut 310 can prevent the nut 310 from backing off during use.

While the filter element 204 is not further described with respect to this embodiment, the filter element 204 may have similar properties and structures as described with respect to the previous embodiment. For example, as illustrated in FIG. 9, fluid has similar fluid flow paths through the assembly as in the previous embodiment. Additionally, it should be noted that any type of filter element may be used to include radial flow elements, axial flow elements, or other such elements depending upon the application.

With regard to FIGS. 12-17, another embodiment of a filter assembly is described. In these figures another embodiment of a support housing assembly is illustrated. This embodiment of a support housing assembly may be used with the previously described filter cartridge 200 or other embodiments of filter cartridges.

Figure 12:
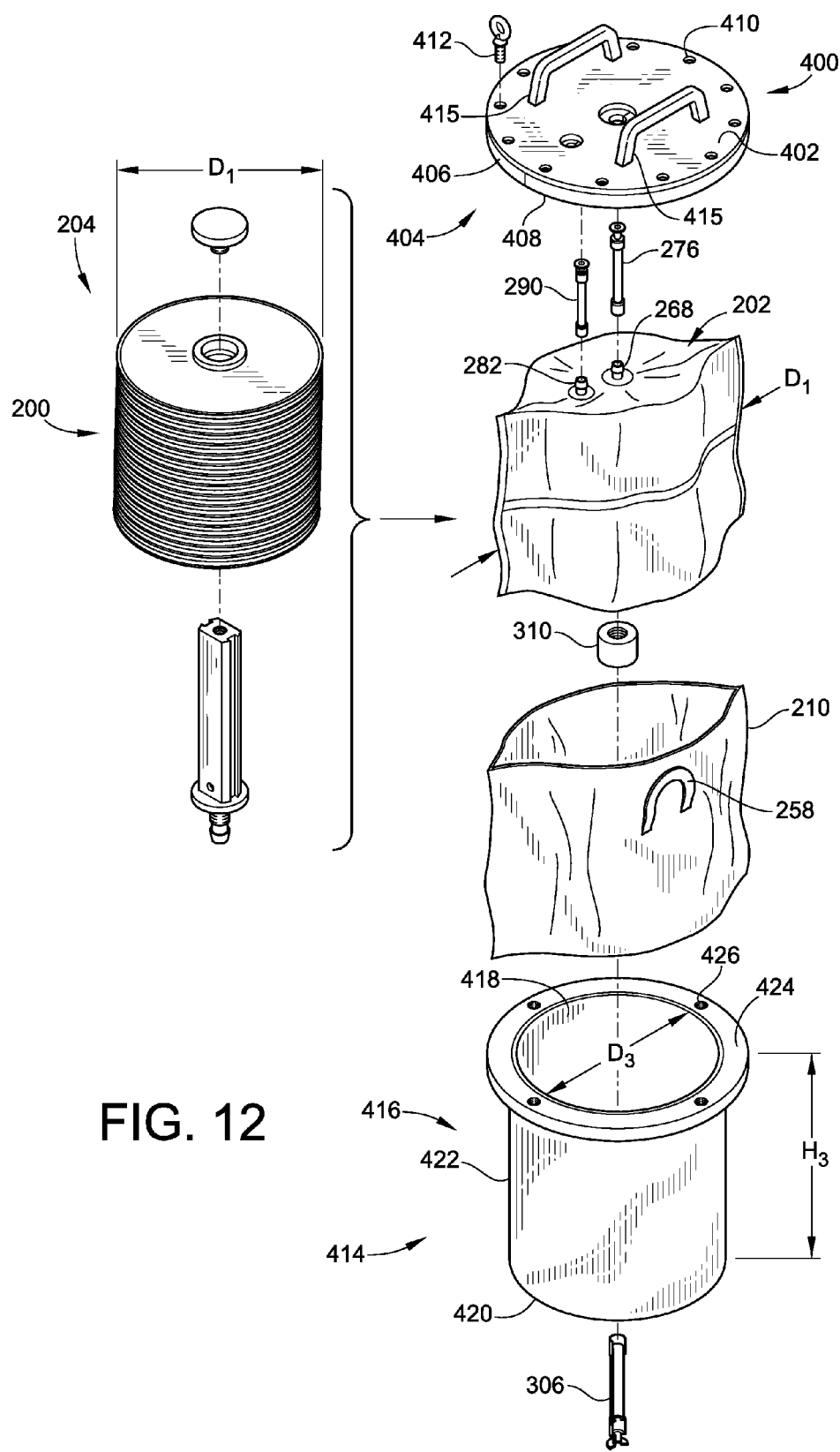
FIG. 12 is an exploded isometric view of the components of a filter assembly including a filter in combination with a filter support housing, in accordance with a third embodiment of the present invention.

The support housing assembly includes a support housing 414 and a lid portion 400 that closes the open end 418 of the support housing 414. The support housing 414 is generally a bowl-like member, including a disc-like base 420 and an annular and axially extending cylindrical side wall 422 extending generally vertically upward from the base 420 to define the open end 418. The side wall 422 may be integrally formed with or coupled to the base 420 by any suitable mechanism. In one embodiment the side wall 422 is coupled to the base 420 by welding. Other suitable couplings may also be used. The open end 418 is sized to receive a filter cartridge and, in one embodiment, an open-topped bag containing a filter cartridge through the open end 418. Extending radially outwardly from the upper end of the cylindrical side wall 422 is a radially extending flange 424. The radially extending flange 424 defines a plurality of threaded apertures 426. While four threaded apertures 426 are illustrated in FIG. 12, other suitable numbers and configurations of apertures are envisioned. The radially extended flange 424 may be integrally formed with the cylindrical side wall 422 or may be coupled with the cylindrical side wall 422 by any suitable mechanism, e.g., welding, adhesive, etc. The threaded apertures 426 are configured to receive and cooperatively threadingly engage threaded portions of fasteners, such as eyebolts 412, allowing the eyebolts 412 to secure the lid portion 400 to the support housing 414 to seal the open end 418 of the support housing 414. Additionally, other mechanisms of securing the lid portion 400 to the support housing 414 are also envisioned.

In one embodiment, the support housing 414 may be formed from polypropylene. In another embodiment the support housing 212 may be formed from metal, such as, for example, stainless steel. The support housing 212 may be formed from any corrosion resistant material capable of withstanding pressure, e.g., corrosion resistant steel, fiber reinforced plastic, etc.

The support housing 414 has an inner diameter $D_3$. In one embodiment the inner diameter $D_3$ is between approximately 8 inches and 16 inches. In another embodiment the inner diameter $D_3$ is between approximately 10 inches and 14 inches. In another embodiment the inner diameter $D_3$ is approximately 12 inches. The support housing 414 is sized to receive and support a filter cartridge. Additionally, the support housing 414, with its inner diameter $D_3$, is configured such that a bag enclosing a filter, such as, for example, bag 202, is supported by the sidewall 422 and the base 420 when the interior of the bag 202 is under pressure during filtering providing strength and allowing for filtering in the interior of the bag 202 to take place with the pressures in the interior of the bag in one embodiment of up to approximately 40 PSI (pounds per square inch) and in another embodiment at pressure of up to approximately 100 PSI.

The support housing 414 has a height $H_3$. In one embodiment the height $H_3$ is between approximately 2 inches and 30 inches. In another embodiment the height $H_3$ is approximately 4.25 inches. In another embodiment the height $H_3$ is approximately 9.5 inches. In another embodiment the height $H_3$ is approximately 13.5 inches. In another embodiment the height $H_3$ is approximately 24 inches. The support housing 414 is sized such that a filter element may fit within the support housing 414, with the inlet and vent fittings of the filter element located proximate the cover 400 and disposed in the apertures defined therein, as will be further described below. Filter cartridges of various suitable sizes may be used in some embodiments based on the height $H_3$ of the embodiment of the support housing. Additionally, in one embodiment the support housing 414 may be mounted on legs which support the support housing.

Figure 14A:
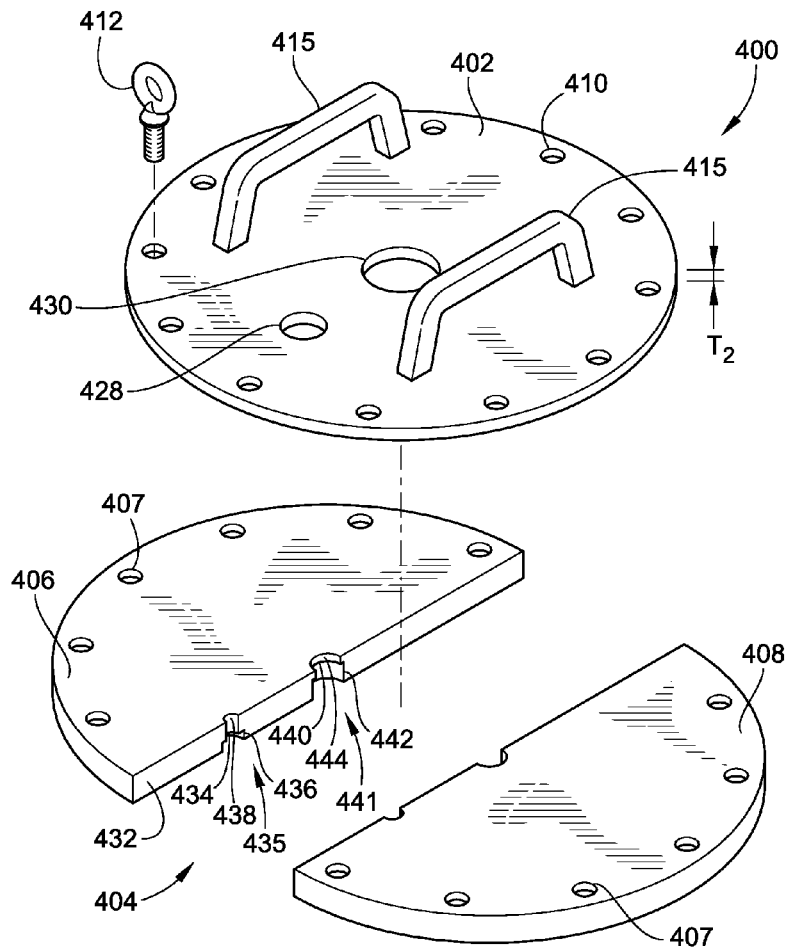
FIG. 14A is an exploded view of the split lid and cover lid of the support housing of FIGS. 12 and 13.

The lid portion 400 is configured to seal the open end 418 of the support housing 414. The lid portion 400 includes a lower split lid portion 404 and an upper cover lid portion 402. With reference to FIG. 14A, the cover lid portion 402 is generally disc-shaped. The cover lid portion 402 defines a plurality of attachment apertures 410 spaced apart proximate its radial periphery. In one embodiment, the attachment apertures may be spaced apart approximately every 15° around the periphery of the cover lid portion 402. Other arrangements, spacings, numbers of attachment apertures, and configurations are also envisioned. In one embodiment the cover lid portion 402 may define threading lining the attachment apertures 410. In another embodiment the cover lid portion 402 may not define threading, but instead define a generally uniform surface lining the attachment apertures 410. The cover lid portion 402 also includes a vent aperture 428 and an inlet aperture 430 spaced apart from the vent aperture 428. In one embodiment the center of the vent aperture 428 is positioned between approximately 1 and 8 inches from the center of the inlet aperture 430. In another embodiment, the center of the vent aperture 428 is positioned approximately 3.95 inches from the center of the inlet aperture 430. In embodiment, the inlet aperture 430 is centered in the center of the cover lid portion 402, with the vent aperture 428 being offset therefrom. Other arrangements and configurations of the vent and inlet apertures 428 and 430 are also envisioned.

In one embodiment, the vent aperture 428 has a diameter of between 0.5 inches and 3 inches. In another embodiment, the vent aperture 428 has a diameter of approximately 1.5 inches. In one embodiment, the inlet aperture 430 has a diameter of between 1 and 5 inches. In another embodiment, the inlet aperture has a diameter of approximately 3 inches.

The cover lid portion 402 has a thickness $T_2$. In one embodiment thickness $T_2$ is between approximately 0.25 and 1 inch. In another embodiment thickness $T_2$ is approximately 0.62 inches. In one embodiment, the cover lid portion 402 is between approximately 12 and 20 inches in diameter. In another embodiment, the cover lid portion 402 is approximately 16 inches in diameter. In one embodiment, the cover lid portion 402 may include chamfered radial peripheral edges.

The cover lid portion 402 may be formed from metal (e.g., stainless steel), plastic, polypropylene, or any other suitable material. The cover lid portion 402 also includes a pair of handles 415 extending upwardly from the cover lid portion 402. The handles 415 are configured to allow a user to easily lift the cover lid portion 402. The handles 415 may be integrally formed with the cover lid portion 402 or may be attached by any suitable means, e.g., welding, adhesive, etc.

Figure 14B:
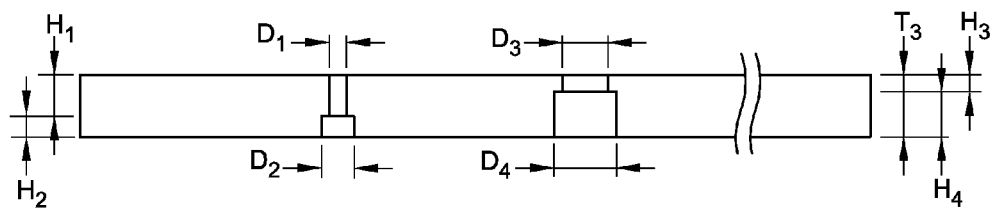
FIG. 14B is a detailed view illustrating various dimensions of the split lid of FIG. 14A.

With reference to FIG. 14B, the split lid portion 404 includes a first lid portion 406 and a second lid portion 408. The first and second lid portions 406 and 408 are generally semi-circularly disc-shaped and are configured to cooperatively fit together and form a generally circular disc, sized to close the open end 418 of the support housing 414. In one embodiment, the first and second lid portions 406 and 408 are substantially similar. Therefore, the first lid portion 406 is described, with the second lid portion 408 being substantially similar thereto.

The first and second lid portions 406 each have a thickness $T_3$. In one embodiment thickness $T_3$ is between approximately 1 and 3 inches. In another embodiment thickness $T_3$ is approximately 2 inches.

With reference to FIGS. 14A and B, the first lid portion 406 includes a generally vertical wall portion 432, which, when the split lid 404 is assembled, is configured to abut a matching generally vertical wall portion of the second lid portion 408. The generally vertical wall portion 432 includes a generally semi-cylindrical recessed portion 434. The semi-cylindrical recessed portion 434 includes a lower semi-cylindrical recessed wall portion 436 and an upper semi-cylindrical recessed wall portion 438 defining a semi-cylindrical aperture 435. The upper semi-cylindrical recessed wall portion 438 has a diameter $D_1$. In one embodiment diameter $D_1$ is between approximately 0.25 and 1.25 inches. In another embodiment diameter $D_1$ is approximately 0.5 inches. The lower semi-cylindrical wall portion 436 has a diameter $D_2$. In one embodiment diameter $D_2$ is between approximately 0.25 and 1.25 inches. In another embodiment diameter $D_2$ is approximately 0.8 inches. The upper semi-cylindrical wall portion 438 has a height $H_1$. In one embodiment, height $H_1$ is between approximately 0.25 and 2 inches. In another embodiment, height $H_1$ is approximately 1.25 inches. The lower semi-cylindrical wall portion 436 has a height $H_2$. In one embodiment, height $H_2$ is between approximately 0.25 and 2 inches. In another embodiment, height $H_2$ is approximately 0.75 inches.

When the first and second lid portions 406 and 408 are assembled the wall portions 436 and 438 of each lid portion 406 and 408 align to form a vent aperture. When the cover lid 402 is assembled with the first and second lid portions 406, this vent aperture will align with the vent aperture 428 in the cover lid 402.

The generally vertical wall portion 432 includes another generally semi-cylindrical recessed portion 440 spaced apart from the semi-cylindrical recessed portion 434. The semi-cylindrical recessed portion 440 includes a lower semi-cylindrical recessed wall portion 442 and an upper semi-cylindrical recessed wall portion 444 defining a semi-cylindrical aperture 441. The upper semi-cylindrical recessed wall portion 444 has a diameter $D_3$. In one embodiment diameter $D_3$ is between approximately 0.25 and 2.0 inches. In another embodiment diameter $D_3$ is approximately 1.15 inches. The lower semi-cylindrical wall portion 442 has a diameter $D_4$. In one embodiment diameter $D_4$ is between approximately 0.25 and 2.5 inches. In another embodiment diameter $D_4$ is approximately 1.75 inches. The upper semi-cylindrical wall portion 444 has a height $H_3$. In one embodiment, height $H_3$ is between approximately 0.25 and 2 inches. In another embodiment, height $H_3$ is approximately 0.5 inches. The lower semi-cylindrical wall portion 442 has a height $H_4$. In one embodiment, height $H_4$ is between approximately 0.25 and 2 inches. In another embodiment, height $H_4$ is approximately 1.5 inches.

When the first and second lid portions 406 and 408 are assembled the surfaces 442 and 444 of each lid portion 406 and 408 align to form an inlet aperture. When the cover lid 402 is assembled with the first and second lid portions 406, this inlet aperture will align with the inlet aperture 430 in the cover lid 402.

In on embodiment, in the assembled configuration of the first and second lid portions 406 and 408, the centers of the vent aperture and the inlet aperture are spaced apart between approximately 1 and 7 inches. In another embodiment, the centers of the vent aperture and the inlet aperture are spaced apart approximately 3.95 inches. In one embodiment, in the assembled configuration of the first and second lid portions 406 and 408, the split lid has a diameter of between approximately 12 and 20 inches. In another embodiment, in the assembled configuration of the first and second lid portions 406 and 408, the split lid has a diameter of approximately 16.06 inches.

In one embodiment, the split lid 404 may be formed as a single piece and split into first and second lid portions 406 and 408 by waterjet cut or any other suitable method.

The first and second lid portions may each be formed from various suitable materials, e.g., stainless steel, other metals, polypropylene, other plastics, fiber reinforced plastic, other corrosion resistant materials, etc.

The first and second lid portions 406 and 408 each define spaced apart around their radial periphery a plurality of threaded fastener receiving apertures 407. In one embodiment the threaded fastener receiving apertures 407 may be spaced apart approximately every 15° around the radial periphery. In other embodiments, other numbers of apertures, arrangements, configurations, and spacings are also envisioned. When the split lid 404 and the cover lid 402 are assembled, the attachment apertures 410 in the cover lid 402 may be aligned with the apertures in the split lid 404. Fasteners such as eye bolts 412 may be passed through the attachment apertures 410 of the cover lid 402 and threadingly engage the fastener receiving apertures 407 of the split lid 404. The eye bolts 412 further pass through the fastener receiving apertures 407 and are received into and threadingly engage with the threaded apertures 426 defined in the flange 424 of the support housing 414 (see FIG. 16). Thus, the cover lid 402, the split lid 404, and the support housing 414 may be releasably secured and held in place relative to one another.

Figure 15:
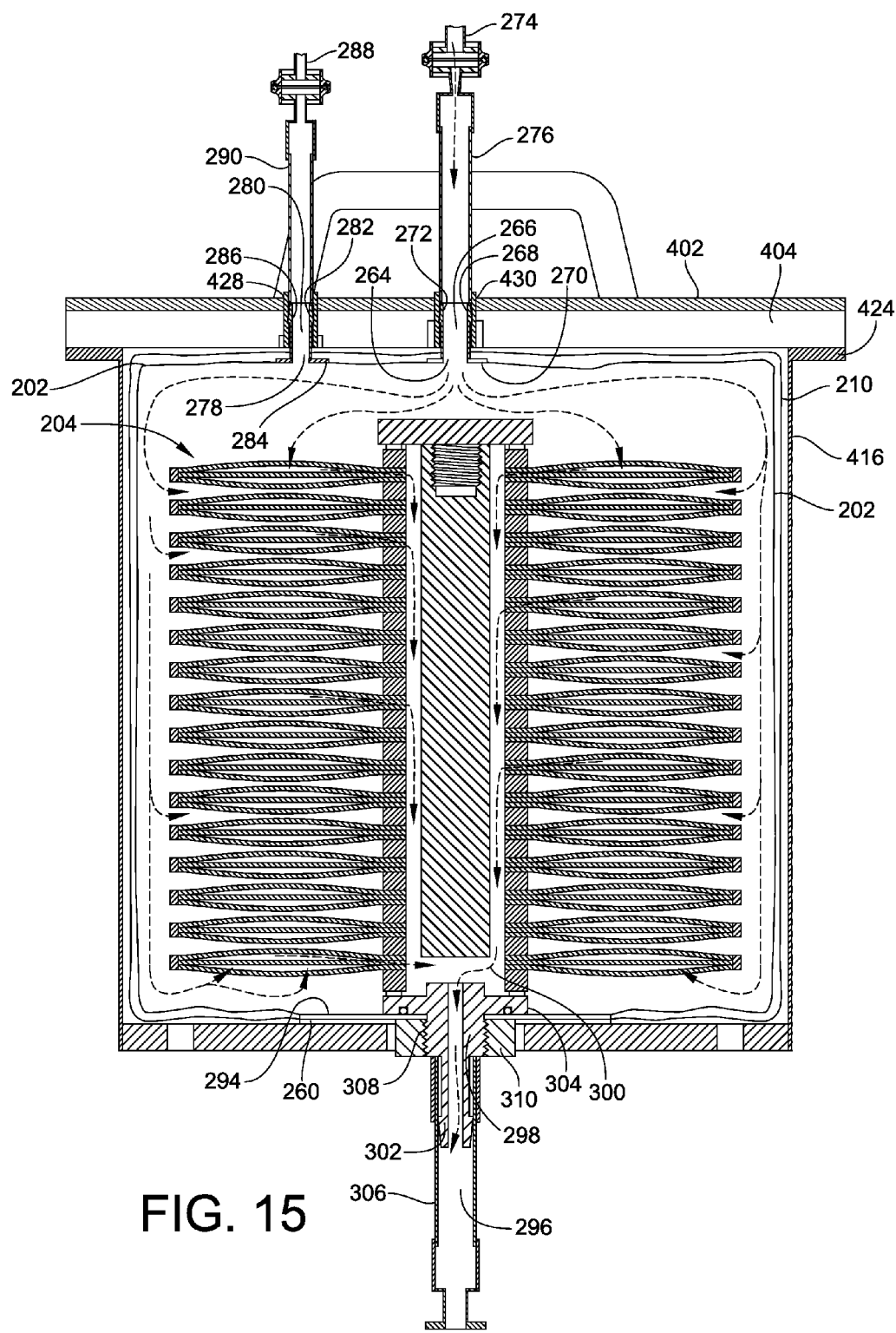
FIG. 15 is a cross section of the filter assembly shown in FIGS. 12 and 13 in an assembled state with fluid flow paths indicated.
Figure 16:
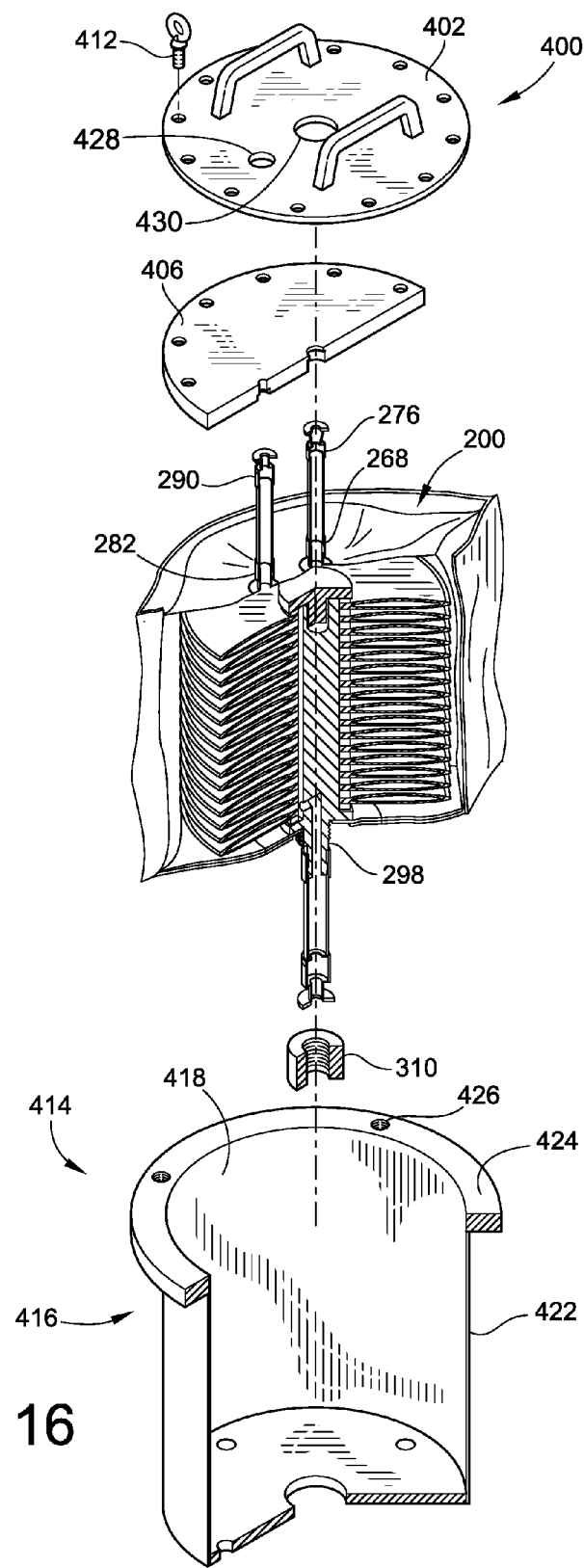
FIG. 16 is a partial cutaway cross-sectional isometric view of the assembled filter of FIGS. 12-15 to illustrate how it is installed within a support housing in which the support housing is shown in exploded view.
Figure 17:
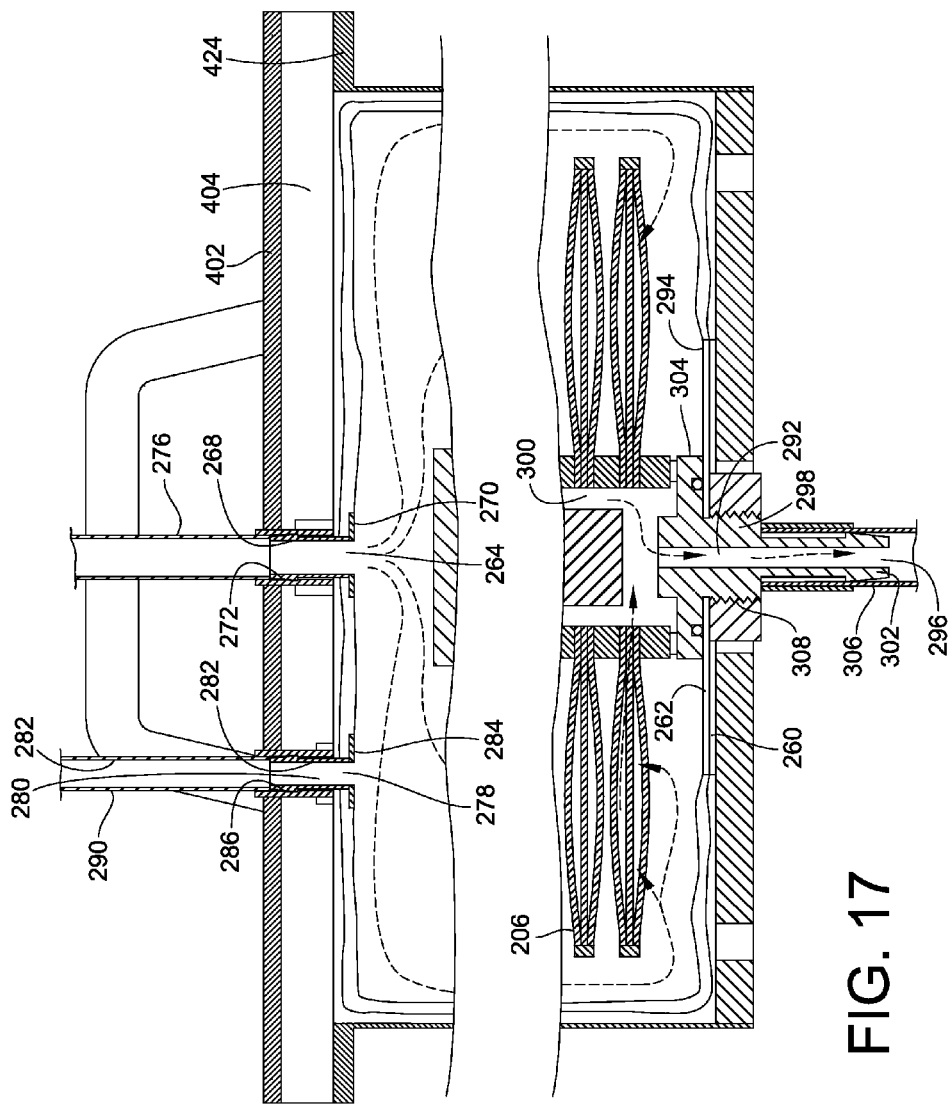
FIG. 17 is an enlarged view of the opposed ends of the filter assembly shown in FIG. 12 to better illustrate how the inlet and outlet fittings are attached to the bag and show that the bag may contain multiple layers as illustrated.

With further reference to FIGS. 15 and 16, the first and second lid portions 406 and 408 are arranged and configured such that in their assembled configuration, inlet and vent fittings of a filter cartridge, such as inlet and vent fittings 268 and 282 (and, in one embodiment, portions of sleeve and collet mechanisms 276 and 290) are held securely within the inlet and vent aperture formed by the assembled first and second lid portions 406 and 408 and are securely maintained in position under the conditions of filtering. The vent and inlet apertures 428 and 430 in the cover lid portion 402 are sized and configured to overlay the inlet and vent apertures of the first and second lid portions 406 and 408 in the assembled configuration and allow access to allow inlet and vent conduits to be put into fluid communication with the inlet and vent fitments 268 and 282.

Figure 13:
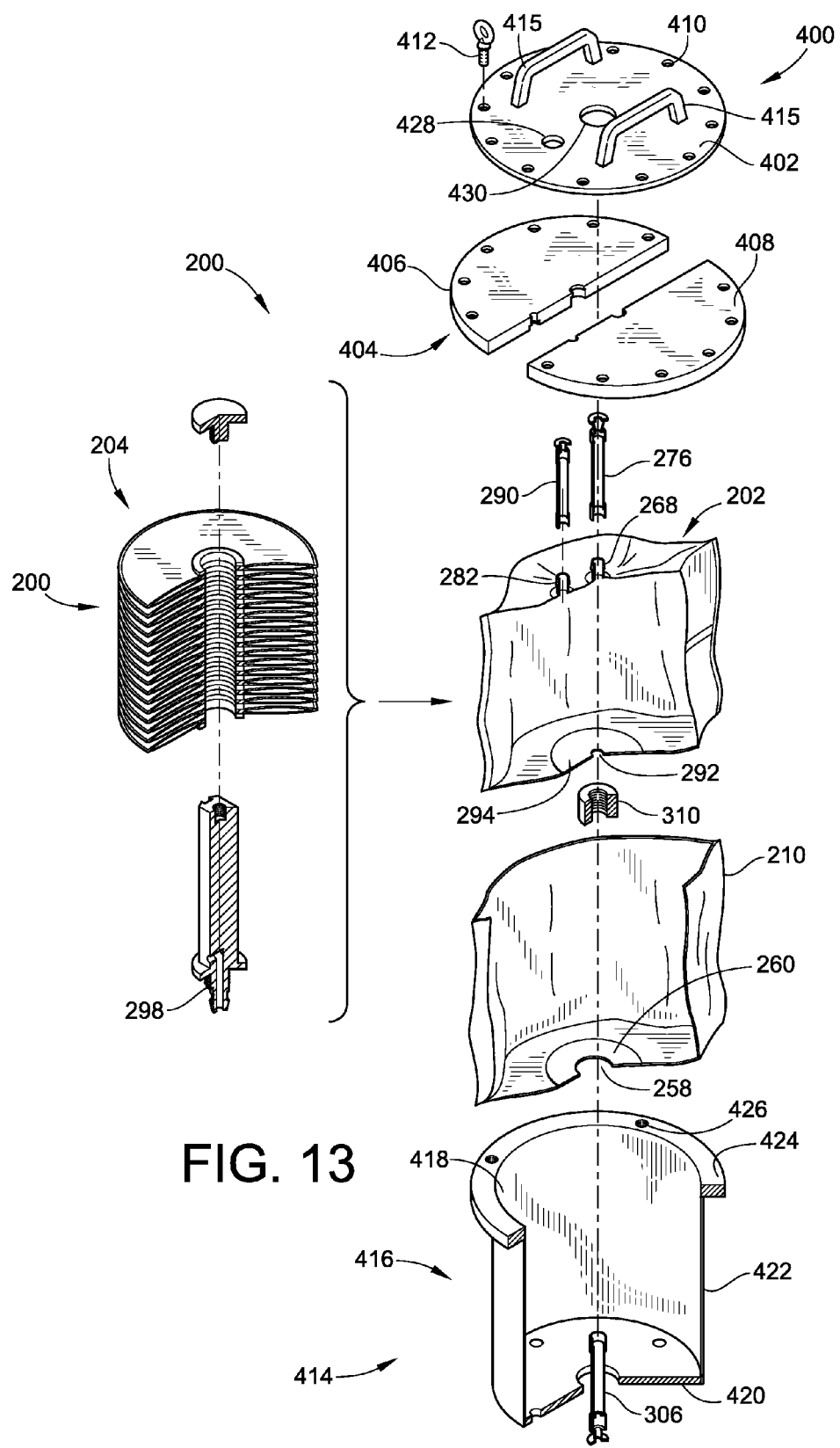
FIG. 13 is a similar exploded view to that of FIG. 12 except showing a partial cutaway cross-sectional view of the components.

With reference to FIGS. 13-15, when the split lid 404 is placed in the assembled configuration, the vent fitment 282 may be arranged such that the lid portions 406 and 408 may be moved together with the vent fitment 282 being located and securely retained within the vent aperture formed by the semi-cylindrical recessed wall portions 434 of each of the lid portions 406 and 408. The semi-cylindrical recessed wall portions 434 are sized, arranged, and configured to securely retain the vent fitment 282 (and, in one embodiment, a portion of the sleeve and collet mechanism 290) therein. Similarly, when the split lid 404 is placed in the assembled configuration, the inlet fitment 268 may be arranged such that the lid portions 406 and 408 may be moved together and secured in the assembled configuration with the inlet fitment 268 being located and securely retained within the inlet aperture formed by the semi-cylindrical recessed wall portions 440 of each of the lid portions 406 and 408. The semi-cylindrical recessed wall portions 440 are sized, arranged, and configured to securely retain the inlet fitment 268 (and, in one embodiment, a portion of the sleeve and collet mechanism 276) therein.

In one embodiment, the characteristics of the split lid 404 and the support housing 414 (and in some embodiments the cover lid 402) provide reliable retention of inlet and vent fitments 268 and 282 of filter cartridges disposed within the support housing 414 during filtering allowing for continued supply of fluid to be filtered to the interior of a filter cartridge as well as support for a bag of a filter cartridge by the support housing 414 under filtering conditions. In one embodiment, the cover lid 402, the split lid 404, and the support housing 414 are configured to support the bag and fitments of a filter cartridge disposed in the support housing when filtering conditions create a pressure of at least 40 PSI (pounds per square inch) within a bag of a filter cartridge. In another embodiment the cover lid 402, the split lid 404, and the support housing 414 are configured to support the bag and fitments of a filter cartridge disposed in the support housing when filtering conditions create a pressure of up to 100 PSI within a bag of a filter cartridge. Specific configurations of embodiments the support housing 414 and the split lid 404 (and in some embodiments the cover lid 402) provide various embodiments with performance characteristics described.

Gaskets, such as annular gaskets, may be provided around the upper and lower periphery of the split lid portion 404 in the assembled configuration to provide sealing between the split lid portion 404 and the cover lid portion 402 and between the split lid portion 404 and the flange 424. In other embodiments, the split lid portion 404 and the cover lid portion 402 may seal to one another without the use of a gasket. In other embodiments the split lid portion 404 may seal to the flange 424 without the use of a gasket.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter assembly, comprising a filter cartridge supported inside a housing, the filter cartridge comprising:
   a containment bag;
   an inlet port extending through the containment bag for receiving fluid into the bag;
   an outlet port extending through the containment bag for outletting fluid from the filter cartridge; and
   a vent port extending through the containment bag; and
   a filter media element disposed in the containment bag and connected to the outlet port;
   wherein each of the ports comprises a fitting including an inlet fitting, an outlet fitting and a vent port fitting, the housing including a bowl having an open end and a split lid having at least two portions that are dividable and joinable, the split lid having an inlet aperture receiving the inlet fitting and a vent aperture receiving the vent fitting.

2. The filter cartridge of claim 1, wherein the inlet port and the vent port are arranged gravitationally above the outlet port along a top side of the bag.

3. The filter cartridge of claim 1, further comprising an inlet fitting providing the inlet port, the containment bag having an inlet opening and being connectively sealed to the inlet fitting, the inlet port extending through said inlet opening into an interior of the bag.

4. The filter cartridge of claim 1, further comprising an outlet fitting connected with the filtered fluid chamber and extending through the annular disc, and wherein the annular disc is fixed relative to and in sealing engagement with the outlet fitting, and wherein the inlet fitting is carried freely by the bag in spaced relation and thereby freely movable relative to the filter media element.

5. The filter cartridge of claim 1, further comprising a filtered fluid chamber, the top of the filtered fluid chamber being closed, the bottom of the filtered fluid chamber being in fluid communication with outlet port.

6. The filter cartridge of claim 1, further comprising an annular filter media element including a plurality of filter discs, the filter discs being stacked and compressed, each of the filter discs including a combination of adsorption and depth loading filtration media.

7. The filter assembly of claim 1, further comprising a carrier bag defining an interior sized to receive the filter cartridge, the carrier bag having an open top and an outlet port adapted to surround the outlet fitting of the filter cartridge.

8. The filter assembly of claim 1, wherein one of the dividable and joinable portions includes at least one projection and another one of the dividable and joinable portions includes at least one projection receiving aperture receiving the at least one projection and joining the dividable and joinable portions.

9. The filter assembly of claim 1, wherein the at least two portions are each generally semicircular disc-shaped portions.

10. A method of filtering fluid comprising:
    inletting unfiltered fluid into a containment bag;
    venting air from the containment bag;
    containing a filter media pack in the containment bag, the filter media pack comprising a hollow interior that has an opening at one end and is closed to fluid flow at a second end opposite the one end;
    filtering the unfiltered fluid through a filter media pack contained in the containment bag to produce filtered fluid; and
    outletting filtered fluid from the filter element and through said opening and through the containment bag;
    wherein the containment bag includes an inlet fitting sealingly attached to the containment bag for inletting unfiltered fluid, a vent fitting sealingly attached to the containment bag for venting the containment bag, and an outlet fitting sealing attached to the containment bag for outletting filtered fluid;
    the method further comprising;
    locating the containment bag in a carrier bag;
    placing the carrier bag containing the containment bag in a housing;
    connecting the inlet, vent, and outlet fittings to inlet, vent, and outlet conduits respectively;
    supporting fluid pressure in the bag when in use with the housing;
    replacing the filter media pack by disconnecting the inlet, vent, and outlet fittings and removing the carrier bag containing the containment bag from the housing with unfiltered fluid still remaining in the bag thereby providing from cleanly removal from the housing; and connecting a new containment bag comprising another filter media pack and having inlet, vent, and outlet fittings to the inlet, vent, and outlet conduits respectively.

11. The method of claim 10, wherein the inlet, vent, and outlet fittings each comprise hose barbs.

12. The method of claim 10, wherein the housing includes a split lid including at least two portions that are dividable and joinable, the split lid having an inlet aperture receiving the inlet fitting and a vent aperture receiving the vent fitting.

13. The method of claim 10, wherein the filter media pack comprises a plurality of filter media discs stacked in a stack, the method further comprising:
compressing the stack; and
placing the stack within the containment bag.

14. A method of filtering fluid comprising:
providing a filter cartridge having an inlet port and an outlet port;
providing a carrier bag for containing the filter cartridge, the carrier bag having an outlet;
placing the filter cartridge within the carrier bag, with the outlet port arranged to allow passage of filtered fluid to pass through the outlet port out of the carrier bag;
placing the carrier bag with the filter cartridge therein in a housing;
providing unfiltered fluid to the inlet port of the filter cartridge, filtering the fluid through the filter cartridge, and having the filtered fluid exit the carrier bag through the outlet; and
utilizing the carrier bag to remove the filter cartridge from the housing.

15. The method of claim 14, wherein the filter cartridge includes a vent port and the carrier bag includes a handle, further comprising:
venting the filter cartridge; and
lifting the filter cartridge from the housing using the handle of the carrier bag.

16. The method of claim 15, further comprising:
enclosing the filter cartridge and the carrier bag within the housing with a split lid, the split lid including dividable and joinable first and second portions which, when joined provide an inlet aperture and a vent aperture.

17. The method of claim 14, wherein the filter cartridge comprises an annular filter media element defining an internal cavity providing a filtered fluid chamber for filtered fluid, one end of the internal cavity being closed and the other end being open and connected to the outlet port.

18. The method of claim 17, wherein the annular filter media element includes a plurality of filter discs, the filter discs being stacked and compressed between the opposed ends, each of the filter discs including a combination of adsorption and depth loading filtration media.

19. The method of claim 18, wherein the filter cartridge further includes resilient spacer rings between adjacent filter discs spacing adjacent filter discs axially relative to each other, and wherein the support core threadingly engages a load element at the closed end, further including an outlet fitting integrally extending from a support core at the open end, the filter discs and plastic spacer rings being compressed axially between the load element and the outlet fitting.

20. A housing for containing and supporting a filter cartridge including a filter element housed in a bag, an inlet fitting projecting from the bag for receiving inlet fluid to be filtered by the filter element, and a vent fitting projecting from the bag, the housing comprising:
a support housing portion having an open end; and
a lid portion selectively closing the open end of the support housing, the lid portion including a split lid including at least two portions, the two portions being dividable and having an assembled configuration;
wherein in the assembled configuration the two portions together define an inlet aperture receiving and maintaining in position the inlet fitting of the filter cartridge.

21. The housing of claim 20, wherein the two portions together define a vent aperture receiving and maintaining in position a vent fitting of a filter cartridge.

22. The housing of claim 20, the lid portion further comprising a cover lid seated on the split lid in an assembled configuration;
the housing further comprising a fastener releasably securing the split lid, the cover lid and the support housing in an assembled configuration.

23. The housing of claim 22, wherein the cover lid is formed from metal; and
wherein the split lid is formed from polypropylene.

24. The housing of claim 20, wherein the support housing further comprises a radially extending flange; and
wherein the housing further comprises a first fastener releasably securing one of the two portions to the support housing portion, a second fastener releasably securing the other of the two portions to the support housing, and wherein the first and second fasteners releasably secure the two portions in an assembled configuration.

* * * * *